US008265122B2

(12) United States Patent
Nakagawa et al.

(10) Patent No.: US 8,265,122 B2
(45) Date of Patent: *Sep. 11, 2012

(54) RECEIVER

(75) Inventors: Tatsuo Nakagawa, Hachioji (JP);
Ryosuke Fujiwara, Kokubunji (JP);
Masayuki Miyazaki, Tokyo (JP);
Goichi Ono, Saitama (JP)

(73) Assignee: Renesas Electronics Corporation, Kanagawa (JP)

( * ) Notice: Subject to any disclaimer, the term of this patent is extended or adjusted under 35 U.S.C. 154(b) by 324 days.

This patent is subject to a terminal disclaimer.

(21) Appl. No.: 12/654,659

(22) Filed: Dec. 29, 2009

(65) Prior Publication Data

US 2010/0103986 A1 Apr. 29, 2010

Related U.S. Application Data

(63) Continuation of application No. 11/288,349, filed on Nov. 29, 2005, now Pat. No. 7,664,163.

(30) Foreign Application Priority Data

Dec. 2, 2004 (JP) ................................. 2004-349459
Oct. 28, 2005 (JP) ................................. 2005-314168

(51) Int. Cl.
*H04B 1/69* (2011.01)
*H04B 1/713* (2011.01)
(52) U.S. Cl. ........ 375/147; 375/316; 375/327; 375/220; 375/222; 375/150
(58) Field of Classification Search .................. 375/354, 375/358, 144, 145, 150, 151, 147; 348/751
See application file for complete search history.

(56) References Cited

U.S. PATENT DOCUMENTS

| 5,999,561 | A  | * | 12/1999 | Naden et al. ................... 375/142 |
| 7,356,100 | B2 | * | 4/2008 | Molisch et al. ............... 375/343 |
| 2003/0119464 | A1 | | 6/2003 | Toyoda et al. |
| 2004/0062325 | A1 | * | 4/2004 | England et al. ............... 375/340 |

(Continued)

FOREIGN PATENT DOCUMENTS

JP 09-238171 2/1996

(Continued)

OTHER PUBLICATIONS

Moe Z. Win et al., "Impulse Radio: How it Works", IEEE Communications Letters, vol. 2, No. 2, (Feb. 1998), pp. 36-38.

(Continued)

*Primary Examiner* — David Ometz
*Assistant Examiner* — Qutbuddin Ghulamali
(74) *Attorney, Agent, or Firm* — Stites & Harbison, PLLC; Juan Carlos A. Marquez, Esq.

(57) ABSTRACT

With the objective of enhancing receiving performance of a receiver with respect to pulse signals spread by spread codes, the receiver comprises an RF front-end section which performs amplification, an AD converter section which AD-converts signals outputted from the RF front-end section, a baseband section which inversely spreads the output of the AD converter section and performs signal detection and demodulation thereon, a reception environment measuring section which measures reception environment using the input signals of the baseband section, and a parameter setting section which sets parameters for respective parts on the basis of signals outputted from the reception environment measuring section. The parameter setting section sets the parameters for the respective parts to the optimum according to the environmental condition measured by the reception environment measuring section.

20 Claims, 26 Drawing Sheets

U.S. PATENT DOCUMENTS

| | | |
|---|---|---|
| 2004/0179582 A1 | 9/2004 | Suzuki |
| 2005/0069052 A1* | 3/2005 | Carbonari ................... 375/316 |
| 2008/0008198 A1 | 1/2008 | Young et al. |

FOREIGN PATENT DOCUMENTS

| | | |
|---|---|---|
| JP | 2003-218722 | 1/2002 |
| JP | 2003-198405 | 7/2003 |
| JP | 2003-218722 | 7/2003 |
| JP | 2004-221939 | 8/2004 |
| WO | WO 02/32066 A2 | 4/2002 |
| WO | WO 03/015302 A1 | 2/2003 |

OTHER PUBLICATIONS

Notification of Reasons for Refusal dispatched by the Japanese Patent Office on Mar. 1, 2011 in Japanese Patent Application No. 2005-314168 (2 pages) with an English language translation (4 pages).

* cited by examiner

*FIG. 14*

| STRT (1151) | TRP_F (1132a1) | TRPCHK_F (1132a2) | TRPCHK_ERF (1132a3) | SFD_ERF (1132b1) | PKTEND_F (1132b2) | TRP_ERF (1132c) | MODCTL / OP_MOD |
|---|---|---|---|---|---|---|---|
| 0 | — | — | — | — | — | — | STBY |
| 1 | 0 | 0 | 0 | 0 | 0 | 0 | TRP |
| 1 | 1 | 0 | 0 | 0 | 0 | 0 | TRPCHK |
| 1 | 1 | 1 | 0 | 0 | 0 | 0 | DEMOD&TRCK |
| 1 | 1 | 0 | 1 | 0 | 0 | 0 | CLR&TRP |
| 1 | 1 | 1 | 0 | 1 | 0 | 0 | CLR&TRP |
| 1 | 1 | 1 | 0 | 0 | 1 | 0 | CLR&TRP OR STBY |
| 1 | 1 | 1 | 0 | 0 | 0 | 1 | CLR&TRP |
| 0 | — | — | — | — | — | — | STBY |

FIG. 15

| BLK / OP_MOD | MFM (510) | TRPM (530) | DEMM (560) | TRCKM (570) | DLTCTL (540) | DLM (550) | SMPCTL (580) |
|---|---|---|---|---|---|---|---|
| TRP | ○ | ○ | × | △[×] | ○ | △[×] | ○ |
| TRPCHK | ○ | ○ | △ | ○[×] | ○ | ○[×] | ○ |
| DEMOD | ○ | △ | ○ | ○[×] | ○ | ○ | ○ |
| STBY | × | × | × | × | × | × | × |

FIG. 18

| PS_STRT (1151a) | PSET_F (1750) | STRT (1151b) | TRP_F (1132a1) | TRPCHK_F (1132a2) | TRPCHK_ERF (1132a3) | SFD_ERF (1132b1) | PKTEND_F (1132b2) | TRP_ERF (1132c) | MODECTL / OP_MOD |
|---|---|---|---|---|---|---|---|---|---|
| 1 | 0 | 0 | - | - | - | - | - | - | INI |
| 0 | 1 | 0 | 0 | - | 0 | 0 | 0 | 0 | STBY |
| 0 | 1 | 1 | 0 | - | 0 | 0 | 0 | 0 | TRP |
| 0 | 1 | 1 | 1 | 0 | 0 | 0 | 0 | 0 | TRPCHK |
| 0 | 1 | 1 | 1 | 1 | 0 | 0 | 0 | 0 | DEMOD&TRCK |
| 0 | 1 | 1 | 1 | 1 | 1 | 0 | 0 | 0 | CLR&TRP |
| 0 | 1 | 1 | 1 | 1 | 0 | 1 | 0 | 0 | CLR&TRP |
| 0 | 1 | 1 | 1 | - | 0 | 0 | 1 | 0 | CLR&TRP OR STBY |
| 0 | 1 | 1 | 1 | - | 0 | 0 | 0 | 1 | CLR&TRP |
| 0 | - | 0 | - | - | - | - | - | - | STBY |

FIG. 19

| BLK \ OP_MOD | ADC (220) | REM (240) PSM (250) | PREG (1710) | OGADJM (500) MFM (510) SADJM (520) | TRPM (530) | DEMM (560) | TRCKM (570) | DLTCTL (540) | DLM (550) | SMPCTL (580) |
|---|---|---|---|---|---|---|---|---|---|---|
| PSET | ○ | ○ | ○ | × | × | × | × | × | × | × |
| STBY (AFT_PSET) | △ | × | ○ | × | × | × | × | × | × | × |
| TRP | ○ | × | ○ | ○ | ○ | × | △[×] | ○ | △[×] | ○ |
| TRPCHK | ○ | × | ○ | ○ | ○ | △ | ○[×] | ○ | ○[△] | ○ |
| DEMOD | ○ | × | ○ | ○ | △ | ○ | × | ○ | ○ | ○ |
| STBY | × | × | × | × | × | × | × | × | × | × |

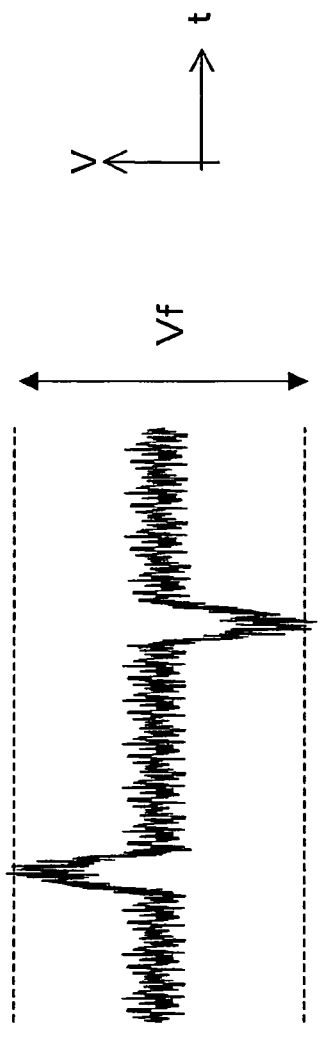
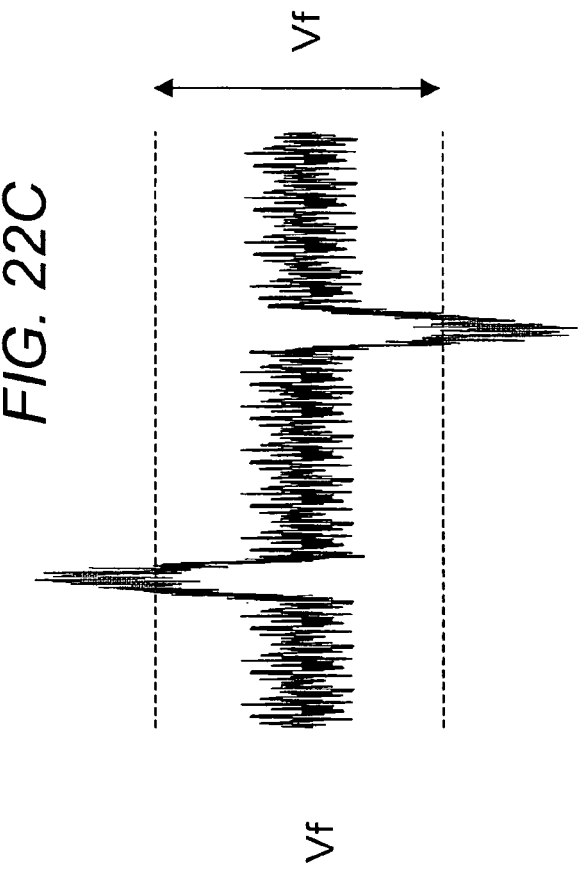
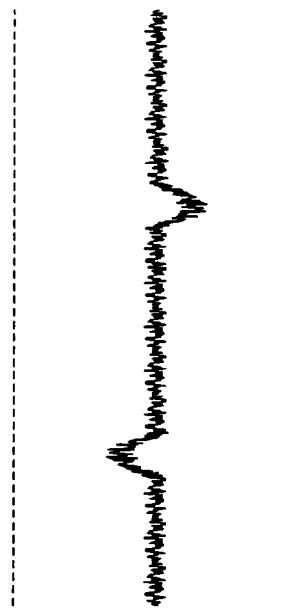

RECEIVER

CROSS REFERENCE TO RELATED APPLICATIONS

This application is a Continuation application of U.S. application Ser. No. 11/288,349 filed on Nov. 29, 2005 now U.S. Pat. No. 7,664,163. The present application claims priority from U.S. application Ser. No. 11/288,349 filed on Nov. 29, 2005, which claims priority from Japanese Application 2004-349459 filed on Dec. 2, 2004, and Japanese Application 2005-314168 filed on Oct. 28, 2005, the contents of which are hereby incorporated by reference into this application.

FIELD OF THE INVENTION

The present invention relates to a communication system using pulse trains spread by spread codes as a transmission signal, and particularly to a receiver suitable for use in the transmission signal.

BACKGROUND OF THE INVENTION

In recent years, a wireless terminal such as a mobile-phone, a wireless LAN (Local Area Network) or the like has remarkably become widespread. A frequency band to be used also extends to a GHz band. Therefore, the use of new frequency bands in communications falls into a difficult situation.

Under such conditions, a communication system using impulse-like pulse trains whose pulse widths are extremely narrow (in the neighborhood of 1 ns, for example) has become a focus of attention as a new use method. As such a communication system using the pulse trains, there is known, for example, an ultra wide band, impulse radio (hereinafter called "UWB-IR" for short) communication system. As its one example, a UWB-IR communication system for modulating Gaussian mono pulses by a pulse position modulation (PPM) system has been disclosed in a non-patent document 1.

In these communication systems using the pulse trains, the transmission of information is done by sending and receiving of an intermittent energy signal as distinct from signal transmission using a normal continuous wave.

Since each of the pulses that constitute each pulse train has the pulse width very narrow as described above, its signal spectrum spreads in frequency band as compared with the communication using the normal continuous wave, and the energy of the signal is dispersed. As a result, the signal energy per unit frequency band becomes small. Thus, communications are enabled without causing interference with other communication system, and the sharing of the frequency band is enabled.

As one application field of the UWB-IR communications, may be mentioned, a wireless sensor network (hereinafter called "sensor network" for short) technique. The sensor network transmits the conditions of persons and things, various conditions such as ambient surroundings for them and environmental data onto a network to realize an increase in the efficiency of business. Further, a novel application has been expected as well. Particular attention is given to the utilization of security, healthcare and the like. Since the UWB-IR communication system is low in power consumption and small in size, it has been expected as a communication apparatus for the sensor network which makes use of terminals each provided with wireless equipment in large quantities.

As this type of related art example, a demodulator capable of controlling gain relative to an analog modulation signal of amplifying means on the basis of amplitude information of a baseband signal obtained as quadrature detection has been disclosed in the patent document 1.

There is also known a technique for controlling signal capture and transition of tracking by a controller in an ultra wide band communication system (refer to, for example, a patent document 2).

There is further known an AGC circuit wherein upon setting the gain of amplifying means by use of a spectrum-spread received signal, gain control is performed using a received signal (on which noise is being superimposed) prior to being inputted to a correlator before synchronous retention, and gain control is carried out using a received signal (from which noise is being removed) spectrum inversely-spread by the correlator after synchronous establishment is made (refer to, for example, a patent document 3).

[Patent document 1]
Japanese Patent Laid-Open No. H9 (1997)-238171
[Patent document 2]
International Patent Publication No. 02/32066, pamphlet (see FIG. 1a)
[Patent document 3]
Japanese Patent Laid-Open No. 2003-218722
[Non-patent document 1]
Moe Z. Win et al, "Impulse Radio: How it works", US Patent document, IEEE Communications Letters, Vol. 2, No. 2, p 36-38 (February, 1998)

SUMMARY OF THE INVENTION

A conventional wireless receiver has decided various settings such as the gain of an amplifier in advance upon a design stage in such a way as to be capable of optimizing receiving performance (so as to allow demodulation performance of a baseband signal to coincide with the optimum condition). However, there was a high possibility that the receiver could not be operated under the optimum condition in practice due to the influence of variations in elemental devices and implementation.

Therefore, a receiver for feeding back information measured by its operation and setting the gain of an amplifier has been proposed by the above patent document 1. This is one wherein an I signal component (inphase signal: In Phase) and a Q signal component (quadrature signal: Quadrature) of a received signal, divided at an RF front end are vector-synthesized to detect $A=\{(I^2+Q^2)^{1/2}\}$, and a control signal corresponding to its value is supplied to the amplifier. Thus, the signal amplifier is gain-controlled to the optimum according to the amplitude level of the received signal at the RF front end.

However, a problem arises in that since the gain is controlled based on amplitude information, it is not possible to compensate for variations in the gains of the I and Q signals, and distortion occurs in constellation so that a bit error rate is increased, thereby degrading the receiving performance.

Although the patent document 2 has described RF control outside a receiver portion including a front-end section of a receiver and such a configuration that the entire receiver portion is controlled by a control signal supplied from an interface unit, it does not show that a controller is provided within the receiver and respective units of the baseband section are individually controlled by the controller.

Since each settable interval is large as the gain of a variable gain amplifier is generally set to a digital value, it was difficult to adjust the gain of the amplifier to the optimum condition.

On the other hand, a problem peculiar to the UWB-IR communication, which is related to the setting of gain, resides in that the setting should be done in a state in which a signal is not received and signal power is unknown. In the normal wireless communication, its control is performed based on the amplitude of a received signal during signal synchronization of trapping (preamble). This, however, is allowed because a continuous wave is normally used as an RF signal. On the other hand, in the UWB-IR communication, the transmission wave is of an ultra-short pulse and a pulse interval is longer than the pulse as described above. It is therefore not possible to discriminate whether a signal detected upon the start of reception is of a communication signal or noise. Thus, there is a need to perform condition settings by use of noise before the reception start.

A first object of the present invention is to provide a UWB-IR type receiver which sets various parameters to the optimum when reception is started, and has high receiving performance.

On the other hand, the problems will be discussed from the viewpoint of the application for UWB-IR wireless communications. In a sensor network application, for example, a reduction in power consumption at each terminal node becomes an important problem. FIG. 1 shows one example of a configuration diagram of a sensor network. A sensor network system comprises nodes (NOD) 100a, 100b, 100c, ..., base stations (BAS) 110a, 110b ..., Internet (INT) 120, a server (SRV) 130 and a terminal (TRM) 140.

The server 130 includes a data base (DBS) 131. A large number of terminal nodes are disposed in a distributed manner under all ambient surroundings. Large amounts of information collected by the respective nodes are gathered into the server via each base station. The pieces of information are effectively utilized on a network such as Internet.

Thus, the sensor network needs to make unnecessary power supply lines and data lines in order to enhance the degree of freedom upon disposing the large number of terminal nodes in the dispersed fashion. That is, the sensor network has a built-in power supply and needs to perform wireless communications. Since the life of the power supply is affected by maintenance costs, power consumption of each terminal node may preferably be low. Each of the terminal nodes 100a, 100b, 100c, ... comprises a sensor (SEN) 101, a controller (CPU) 102, memories (nonvolatile memory ROM 103/volatile memory RAM 104), wireless equipment (transmitter TX105/receiver RX106) and a power supply (PWR) 107. As the parts large in power consumption, of these, may be mentioned, the wireless equipment. That is, a low-power wireless system become a challenge.

A second object of the present invention is to provide a UWB-IR type receiver whose power consumption is low.

Summaries of representative ones of the inventions disclosed in the present specification will briefly be explained as follows: That is, there is provided a receiver according to the present invention that receives each of signals spread by spread codes, comprising an RF front-end section which performs filtering and amplification on each received signal, an AD converter section which analog-digital converts signals outputted from the RF front-end section, a baseband section which inversely spreads the output of the AD converter section and performs signal detection and demodulation thereon, a reception environment measuring section which measures reception environment using the signals inputted to the baseband section, and a parameter setting section which sets parameters for the respective sections on the basis of the output signals of the reception environment measuring section.

Owing to such a configuration, the receiver measures an environmental condition of space in which the corresponding device is placed, through the reception environment measuring section before a receiving operation is started, determines the optimum values of parameters such as the gain of each amplifier for amplifying the received signal according to the result of measurement, an offset of the received signal, the number of operations for AD converters in the AD converter section, a synchronous trapping threshold value, the number of synchronous confirmations, etc., and generate control signals to enable control on respective parts of the receiver, thereby enabling a receiving operation associated with each UWB-IR type signal.

There is also provided a receiver according to the present invention, which receives pulse signals spread by spread codes, comprising a mode controller for controlling operation modes of the baseband section that demodulates each of the received signals. Thus, it is possible to state-control in detail operating states of the receiver or operating/non-operating states of respective portions inside the receiver and attain a reduction in power consumption.

According to the present invention, the reception can be started according to the optimum settings corresponding to the environment. Receiving performance such as the accuracy of synchronous trapping, a bit error rate, etc. can be enhanced. Hence the pulse signal can be demodulated with a high degree of accuracy. The operations/non-operations of the respective portions can be controlled according to the receiver or the operating states of the receiver, whereby a reduction in power consumption of the receiver can be realized.

BRIEF DESCRIPTION OF THE DRAWINGS

FIG. 14 is a diagram showing the relationship between mode controller input signals and operation modes employed in the second embodiment;

FIG. 15 is a diagram showing operating/non-operating states of respective blocks in the baseband section in the respective operation modes in the second embodiment;

FIG. 18 is a diagram showing the relationship between mode controller input signals and operation modes employed in the third embodiment;

FIG. 19 is a diagram illustrating operating/non-operating states of respective blocks in a baseband section in the respective operation modes employed in the third embodiment;

FIGS. 22A to 22C are diagrams showing input waveforms of the AD converter at the time that a signal of SNR=SNRmin is inputted;

DETAILED DESCRIPTION OF THE PREFERRED EMBODIMENTS

Respective embodiments of receivers according to the present invention will hereinafter be described in detail using the accompanying drawings.

First Preferred Embodiment

Figure 1:
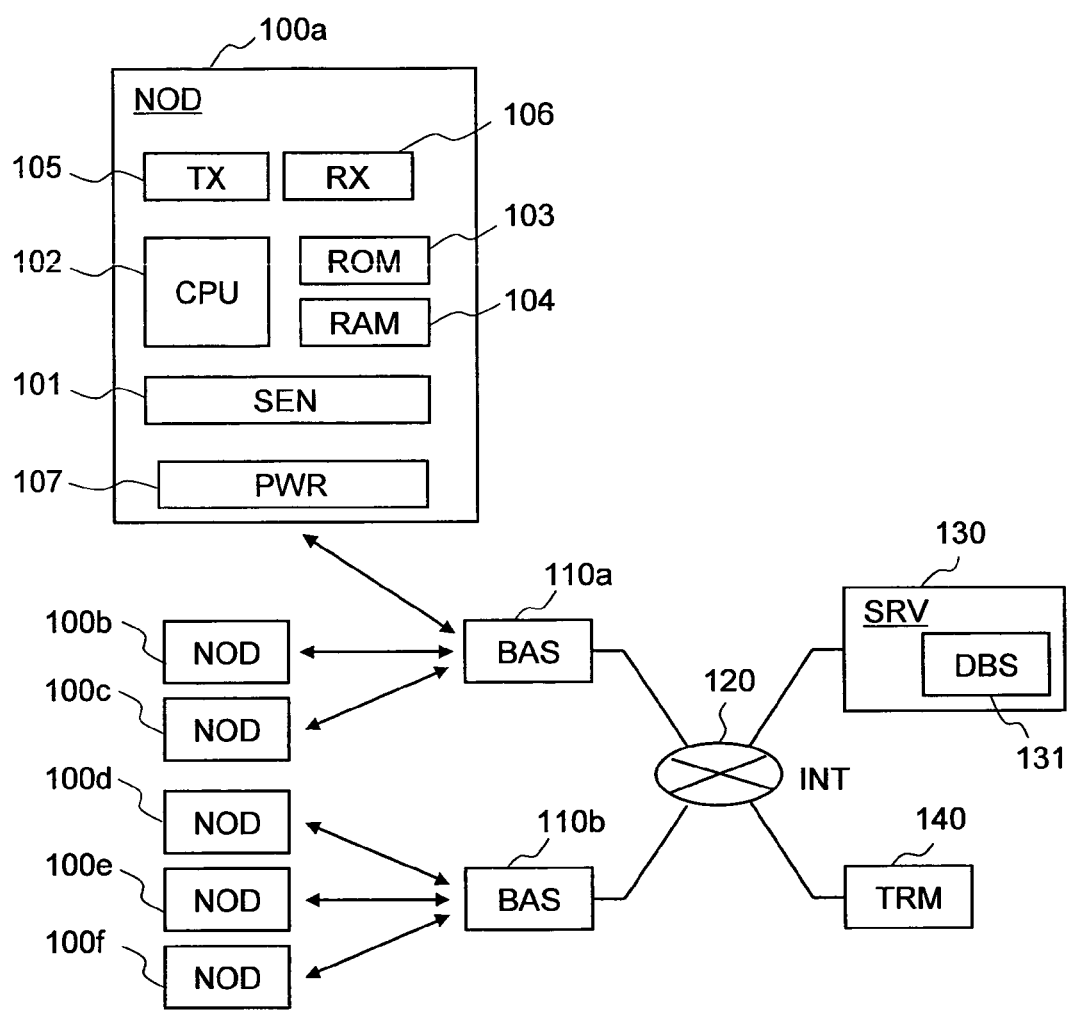
FIG. 1 is a configuration diagram showing one example of a sensor network equipped with a receiver according to the present invention.
Figure 2:
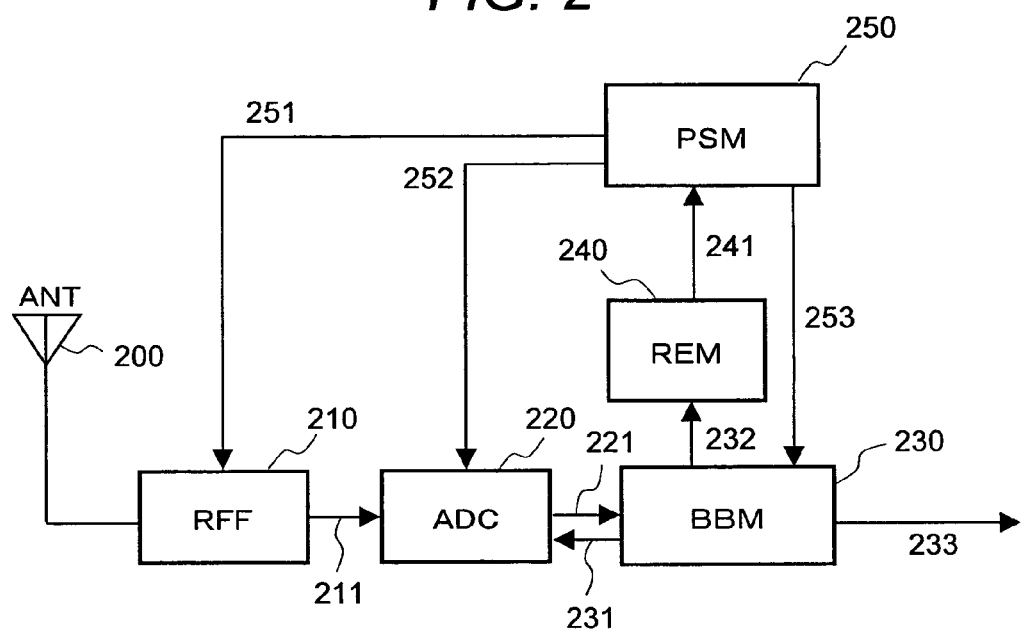
FIG. 2 is a circuit block diagram illustrating a configuration of a first embodiment of a receiver according to the present invention.

FIG. 2 shows an overall view of a first embodiment illustrative of a receiver according to the present invention. The receiver of the present embodiment comprises an RF front-end section (RFF) 210, an analog-digital converter section (ADC) 220, a baseband section (BBM) 230, a reception environment measuring section (REM) 240, a parameter setting section (PSM) 250 and an antenna (ANT) 200.

Figure 20:
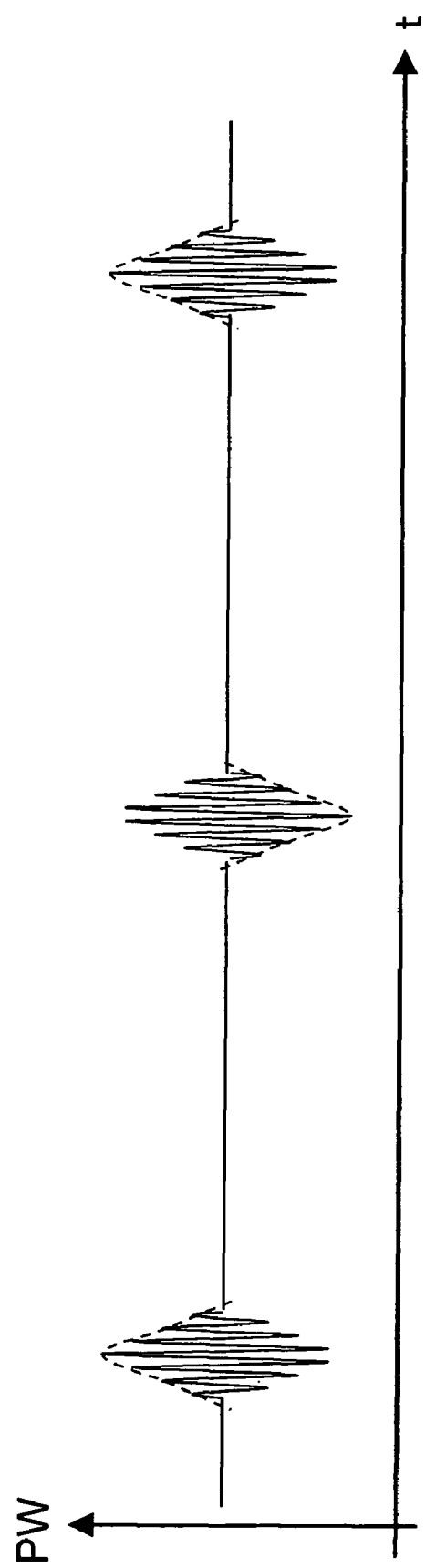
FIG. 20 is a waveform diagram illustrating one example of a pulse train that propagates through space.

The receiver of the present embodiment aims to receive a radio signal using pulse trains. For example, a transmitting device or transmitter transmits BPSK-modulated (Binary Phase Shift Keying: binary digital phase-modulated) and directly-spread pulse trains to space. The antenna ANT shown in FIG. 2 receives the pulse train signal propagated through the space. As the pulse train signal propagated through the space, may be used, for example, a high frequency signal obtained by setting a Gaussian waveform having a width at which a standard deviation σ is about 2 ns, as an impulse signal and multiplying it by a sine wave of about 4 GHz as a carrier wave. A frequency spectrum of this signal results in a wideband signal having a spread ranging from about 3 GHz to about 5 GHz. In order to perform the BPSK modulation, an impulse having positive/negative two values is used as the Gaussian waveform. Upon directly spreading the pulse trains, a width of about 30 ns, for example is used as the interval between the pulse trains. FIG. 20 shows one example illustrative of pulse trains propagated through space.

In FIG. 20, the vertical axis indicates signal power PW and the horizontal axis indicates time t. Waveforms indicated by dotted lines indicate positive/negative Gaussian waveforms each having a width at which a standard deviation σ is about 2 ns, and waveforms indicated by solid lines indicate pulse trains obtained by up-converting the Gaussian waveforms with a sinusoidal carrier wave of, for example, 4 GHz, respectively.

The RF front-end section 210 performs analog signal processing such as filtering, noise removal and amplification, and frequency converting processing on the signal received by the antenna as needed.

Figure 3:
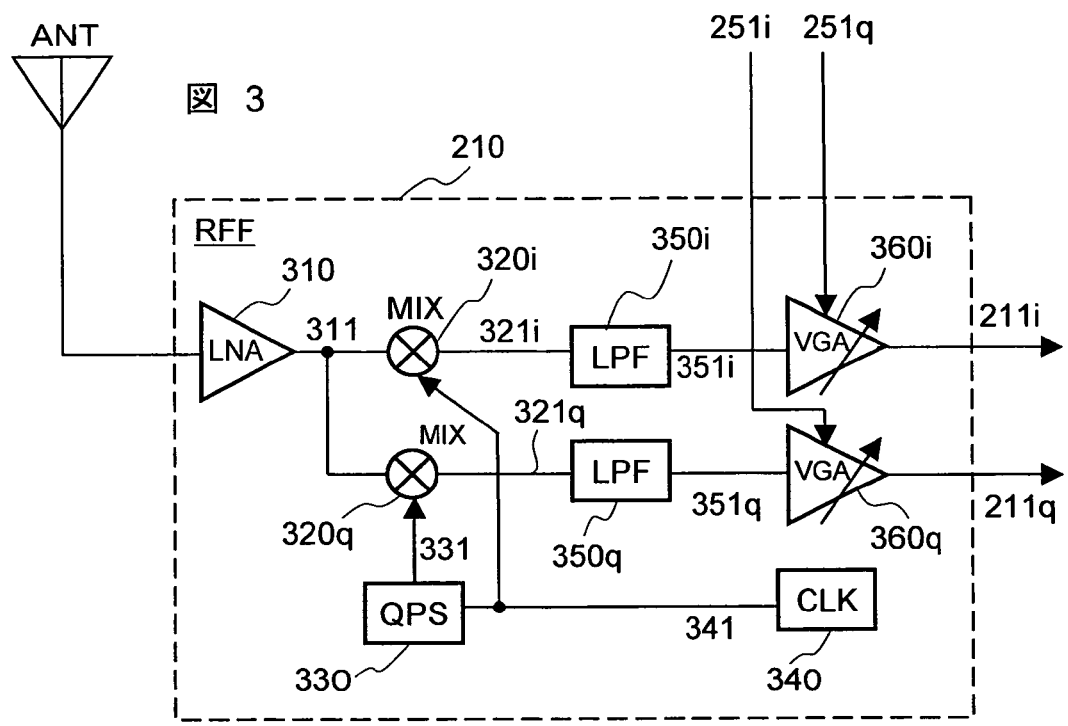
FIG. 3 is a circuit block diagram showing a configuration of an RF front-end section of the first embodiment.

FIG. 3 shows a configurational example of the RF front-end section (RFF) 210. The RF front-end section 210 comprises a low noise amplifier (LNA) 310, mixers (MIX) 320$i$ and 320$q$, a π/2 phase shifter (QPS) 330, low pass filters (LPF) 350$i$ and 350$q$, a variable gain amplifier (VGA) 360 and a clock generator (CLK) 340. Incidentally, subscripts i and q respectively indicate ones for I and Q signals. In the following description, the subscripts i and q are omitted unless otherwise specially required. Where subscripts are omitted from a plurality of identical constituent elements, other reference numerals also indicate the same constituent elements.

A pulse signal (intermittent pulse trains) received by the antenna is amplified by the low noise amplifier 310, followed by being supplied to the mixers 320. Each mixer 320 is supplied with a clock signal of about 4 GHz generated by the clock generator 340. As a result, the output of the mixer 320 is separated into a carrier wave of a 4 GHz band and an impulse signal of a Gaussian waveform having a width at which a standard deviation σ is 2 ns. At this time, the mixer 320$i$ is directly supplied with a signal 341 generated from the clock generator 340, and hence an I signal corresponding to an inphase output signal is outputted therefrom. Since the mixer 320$q$ is supplied with a clock signal obtained by allowing the clock signal of the clock generator 340 to pass through the π/2 phase shifter 330 and delaying the phase thereof by π/2, the output signal of the mixer 320$q$ results in a Q signal corresponding to a quadrature component.

The carrier wave of 4 GHz is used as a signal of the same frequency as a clock signal for generating a radio communication waveform by the transmitting device and a clock signal for capturing a waveform by the receiver.

However, the transmitter and the receiver exist separately at space away from each other and they are not synchronized with each other. Therefore, the clocks of 4 GHz do not coincide with each other in phase. Since the signal can be captured even though the phase of each carrier wave is asynchronous, the separation thereof into two types of signals corresponding to I and Q signals is used. The two signals are finally combined or synthesized by the baseband section, where signal detection is enabled. The signals separated by the mixers 320 are discriminated by their corresponding low pass filters 350, where carrier waves of 4 GHz high in frequency are cut off. Thus, only Gaussian impulse waveforms are outputted from the low pass filters 350. These impulse signals 351 are amplified by their corresponding variable gain amplifiers 360 and the amplified signals are outputted from the RF front-end section 210 as an I signal 211$i$ and a Q signal 211$q$ respectively. The gains of the variable gain amplifiers 360 are first supplied as initial values but controlled to optimum values by control signals 251$i$ and 251$q$ outputted from the parameter setting section 250, respectively.

One example in which the gain of each variable gain amplifier 360 is set to the optimum will now be explained. The gain of the amplifier 360 is set based on, for example, the minimum sensitivity (SNRmin) of the receiver, a full-scale voltage (Vf) of the AD converter and noise (N) of ambient surrounding. The minimum reception sensitivity is expressed as the minimum SNR (SNRmin) demodulable by the receiver using its signal-to-noise ratio (SNR: Signal to Noise Ratio). When the SNR of a received signal receiver is larger than SNRmin, its demodulation is enabled. The influence of quantization noise of the AD converter reaches the minimum where the full-scale voltage is inputted. That is, the sensitivity of the receiver becomes the highest where the received signal is amplified to the full-scale voltage of the AD converter.

When a signal corresponding to the minimum reception sensitivity is inputted, the gain (G) of the amplifier is set in such a manner that its signal component is amplified to the full-scale voltage. That is, the gain is set so as to meet G·(SNRmin·N)=Vf.

Figure 21B:
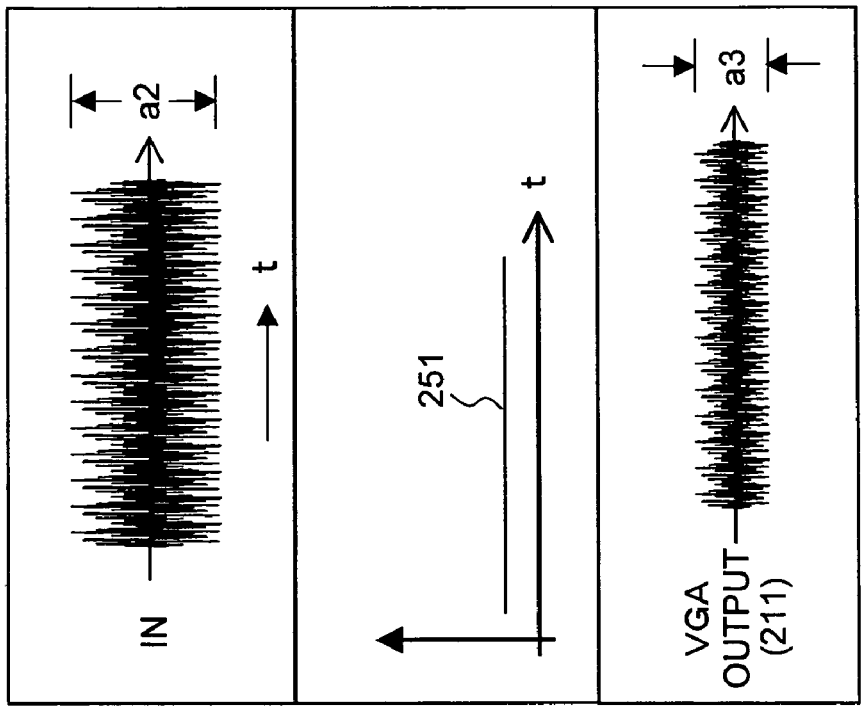
FIGS. 21A and 21B are explanatory diagrams showing the relationship between input signals of the RF front-end section and a gain setting signal and an output signal of VGA.
Figure 21A:
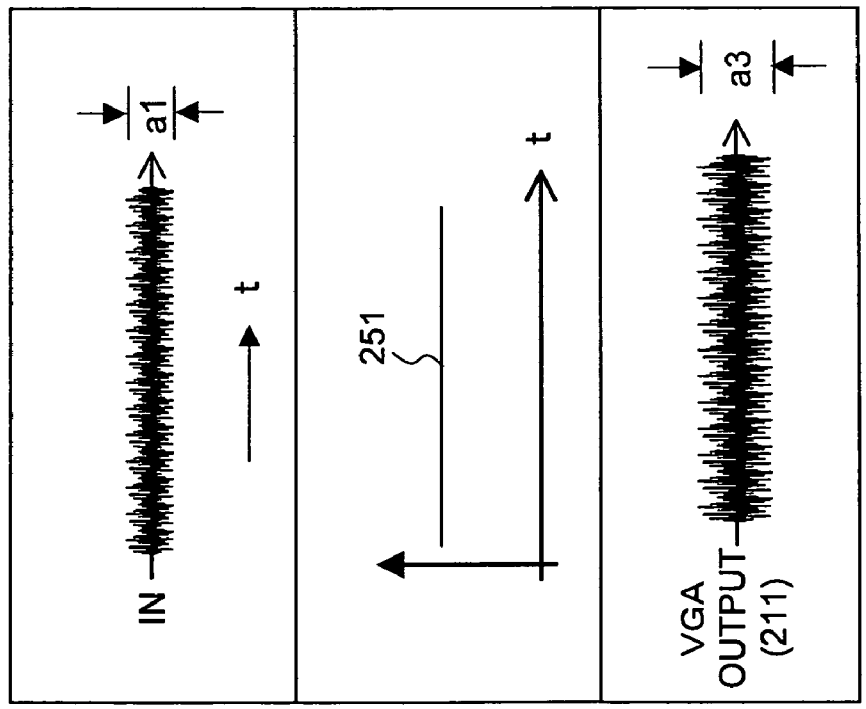

FIGS. 21A and 21B show the relationship among an input signal of the RF front-end section 210, a VGA gain control signal 251 corresponding to a control signal outputted from the parameter setting section (PSM) 250, and a VGA output signal 211 of the RF front-end section 210. FIG. 21A shows a case in which the power level of the input signal IN is small like a1, and FIG. 21B shows a case in which the power level of the input signal IN is large like a2. The upper, middle and lower stages in the same figure A and B respectively show the input signal IN, gain control signal 251 and VGA output signal 211.

As to the gain of each VGA, the value of the gain control signal 251 is set in such a manner that the level of the VGA output signal 211 becomes constant depending upon the magnitude of noise power of the input signal. At the mention of FIGS. 21A and 21B, when the noise power level of the input signal is small like a1 as shown in the same figure A, the set value of the gain control signal 251 is made large and the VGA output signal 211 is raised to a predetermined level a3. Similarly, when the power of the input signal is large like a2 as shown in the same figure B, the set value of the gain control signal 251 is made small and the VGA output signal 211 is brought to a predetermined level a3. Thus, the level of the VGA output signal becomes approximately constant as the predetermined level a3 without depending on the input level.

By setting the gain of each VGA in this way, the influence of quantization noise can be suppressed to the minimum in the case of the minimum reception sensitivity, and hence the performance of the receiver can be brought out to the maximum. Incidentally, the gain setting signal 251 may be a digital value or an analog value but is expressed in analog representation to make it easy to understand it in FIGS. 21A and 21B.

FIGS. 22A to 22C show input waveforms of the AD converter when a signal of SNR=SNRmin is inputted. The vertical axis indicates a signal voltage V and the horizontal axis indicates time t respectively. FIG. 22A shows a case where the gain is set to the optimum. The signal voltage is approximately equal to the full-scale voltage Vf of the AD converter and the influence of quantization noise is minimum. Even when a signal that has satisfied the SNR of the minimum reception sensitivity is received where the gain is set lower than the optimum value as shown in the same figure B, the signal cannot be demodulated due to the quantization noise or the like of the AD converter. When the gain is set higher than the optimum value as shown in the same figure C in reverse, noise components are excessively amplified and hence the necessary SNR cannot be ensured, thus causing an inability to perform signal demodulation.

Figure 23A:
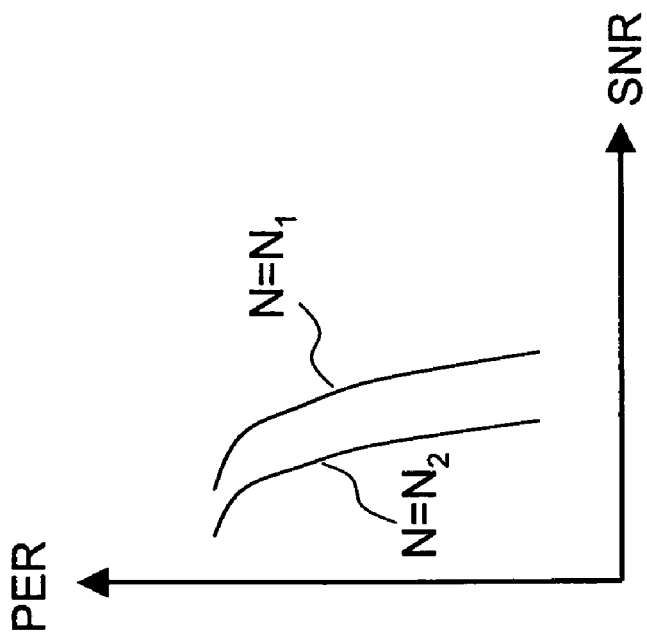
FIGS. 23A and 23B are diagrams illustrating the relationship between the SNR of an input signal and a packet error.
Figure 23B:
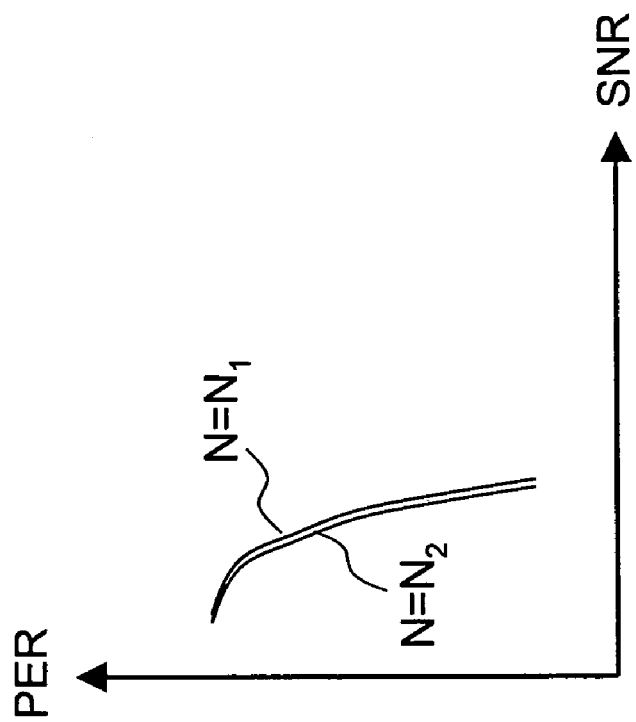

FIGS. 23A and 23B show the relationship between the SNR of an input signal and a packet error rate (PER). The same figure A shows a case in which the gain of each VGA is not set depending upon the magnitude of noise power of the input signal, and the same figure B shows a case in which the gain of the VGA is set in such a manner than the output thereof becomes constant depending upon the magnitude of the noise power of the input signal as in the present embodiment.

In the same figure A, PERs are much different where the magnitude of the noise N is taken as N1 and N2. In the same figure B contrary to it, the characteristics approximately identical to each other are shown regardless of different magnitudes N1 and N2 of noise.

That is, PER depends on SNR under such circumstances that the gain is set to the optimum as in the present embodiment. However, PER is almost independent of the magnitude of noise (N) (refer to FIG. 23B). On the other hand, it is understood that when the gain is not set to the optimum, PER changes depending upon the value of noise even though SNR is constant (refer to FIG. 23A). Thus, the noise of ambient surrounding is measured and the gain is set to the optimum, whereby the receiver can be brought to high sensitivity.

The analog-digital converter (hereinafter abbreviated as "AD converter") section 220 is inputted with Gaussian waveform impulse signals constituted as an I signal 211i and a Q signal 211q, corresponding to the output signal of the RF front-end section 210, which in turn is converted into a digital signal by the AD converter from which it is outputted.

Figure 4:
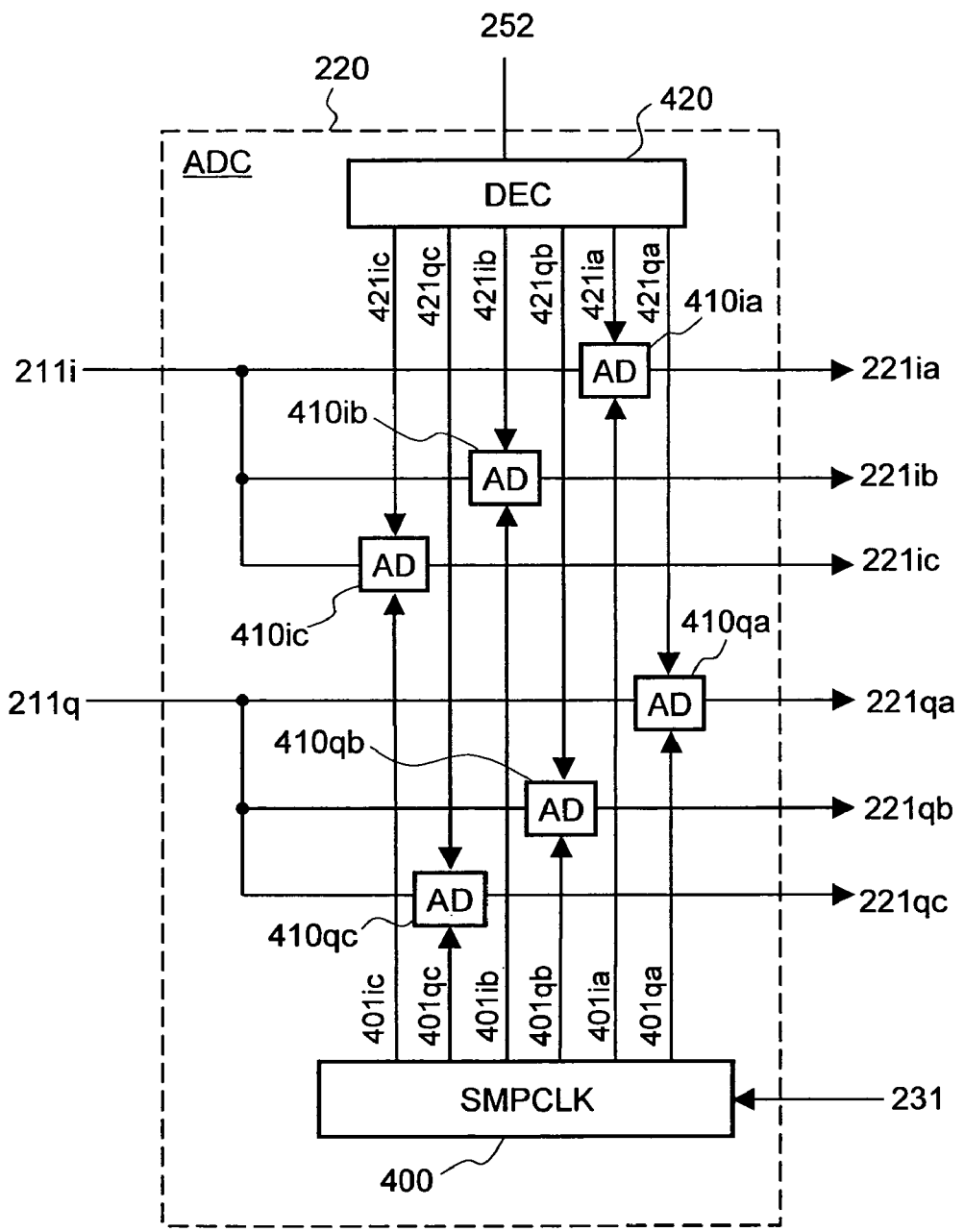
FIG. 4 is a circuit block diagram showing a configuration of an AD converter section of the first embodiment.

FIG. 4 shows a configuration example of the AD converter section (ADC) 220. The AD converter section 220 comprises a decoder (DEC) 420, a plurality of AD converters (ADs) 410ia~c and 410qa~c and a sampling clock generator (SMP-CLK) 400. The analog Gaussian impulse signals corresponding to the I and Q input signals are inputted to the AD converter section 220 as intermittent pulse trains.

The input signals 211i and 211q are respectively divided into plural form, which are supplied to their corresponding internal individual AD converters 410 where they are converted into digital signals of plural bits. In the respective AD converters 410, sampling timings for converting the signals into the digital values are controlled by sampling clocks inputted to the AD converters 410ia, 410ib and 410ic, for example. These sampling clocks are supplied from the sampling clock generator 400. Sampling clocks, which are respectively 0.5 ns in delay difference, are supplied by way example. That is, when the Gaussian impulse signals respectively have standard deviations each having a width of 2 ns, the impulse signals are converted to digital values at positions different 0.5 ns by 0.5 ns, after which they are outputted. The sampling clock generator 400 generates sampling clocks 401ia~c and 401qa~c for deciding sampling timings of the AD converters, in accordance with a sampling timing control signal 231 supplied from the baseband section 230. The decoder 420 selects the corresponding AD converter to be operated in accordance with a used-number-of-signals setting signal 252 supplied from the parameter setting section 250.

The baseband section 230 performs signal processing such as synchronous trapping, synchronous confirmation, signal demodulation and synchronous tracking, and sampling timing control on the AD converter section 220 using the received signal converted to the digital values. The demodulated data is outputted from the baseband section 230 and transferred to an upper layer, where data processing is effected thereon.

Figure 5:
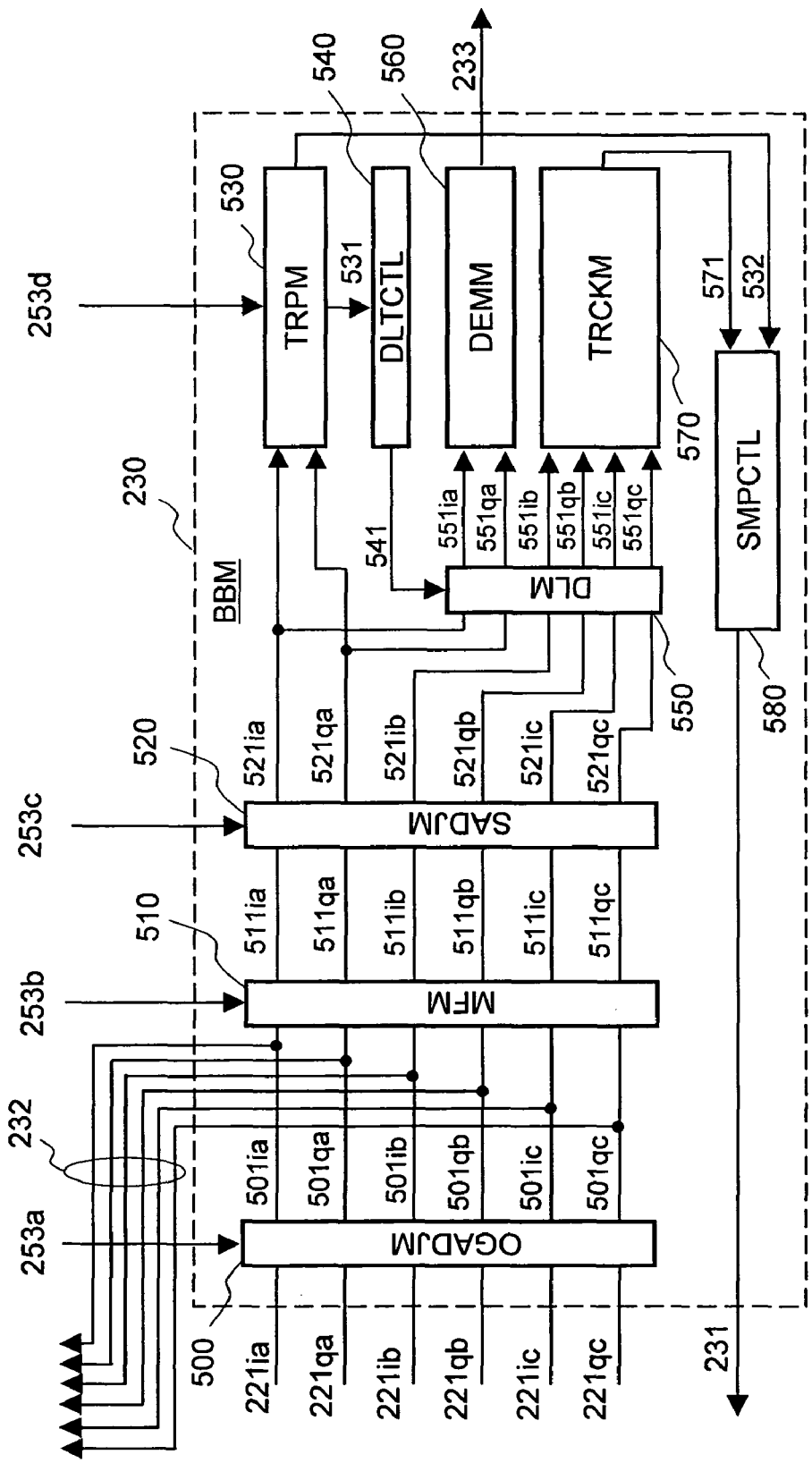
FIG. 5 is a circuit block diagram depicting a configuration of a baseband section of the first embodiment.

FIG. 5 is a block diagram of the baseband section (BBM) 230. The baseband section 230 comprises an offset/gain adjustment unit (OGADJM) 500, a matched filter unit (MFM) 510, an input signal adjustment unit (SADJM) 520, a synchronous trapping unit (TRPM) 530, a data holding timing controller (DLTCTL) 540, a data holding unit (DLM) 550, a demodulator (DEMM) 560, a synchronous tracking unit (TRCKM) 570 and a sampling timing controller (SMPCTL) 580.

A plurality of digitized I and Q signals $221ia$~$221ic$ and $221qa$~$221qc$ supplied from the AD converter section 220 are digitally controlled by the offset/gain adjustment unit 500 as to their offset values and gain amounts. The matched filter unit 510 detects the degree of matching of the outputs signals 501 with expected spread codes and outputs the results of their measurements as signals 511 respectively. The input signal adjustment unit 520 adjusts the relationship of connections between the input signals 511 and their corresponding output signals 521 according to how many kinds of the digital signals 221 supplied from the AD converter section 220 are supplied. When, for example, the signals $511ia$ and $511qa$ are not inputted, the result of addition of the signals $511ib$ and $551ic$ is outputted as $521ia$, and the result of addition of the signals $511qb$ and $511qc$ is outputted as $521qa$. When all signals are being used, the signals 511 are outputted as the signals 521 as they are.

The synchronous trapping unit 530 performs synchronous trapping of the received signal (impulse trains) and confirmation of trapping thereof, using the signals $521ia$ and $521qa$. While the synchronous trapping is not being established, the synchronous trapping unit 530 adjusts the sampling timing controller 580 using a signal 532, and the AD converter section 220 changes timings for converting the received signal into digital form, using the sampling timing control signal 231. When the synchronous trapping is established, the synchronous trapping unit 530 transfers information about synchronous timing to the data holding timing controller 540 through a signal 531.

The data holding timing controller 540 supplies a control signal 541 to the data holding unit 550 with timing synchronized with the received signal. The data holding unit 550 transfers only data matched with its timing to the demodulator 560 and the synchronous tracking unit 570 as a signal 551. The demodulator 560 demodulates the data, based on the signal selected by the data holding unit 550 and outputs digital data 233.

The synchronous tracking unit 570 detects, based on the signal selected by the data holding unit 550, whether it is out of sync with the received signal. When the sync shift occurs, the synchronous tracking unit 570 adjusts digital converting timing of the AD converter section 220 through the sampling timing controller 580 in accordance with the sampling timing control signal 231.

In the UWB-IR system, the impulses each having a short duration of about 2 ns are received at long intervals of about 30 ns. Thus, it is necessary to perform long-period synchronism at 30-ns intervals with a high accuracy of 2 ns or less. Although the synchronous tracking is unnecessary if the accuracy of frequency of a crystal oscillator used for clock generation of each of the transmitter and receiver is high, the crystal oscillator high in accuracy becomes expensive. With the objective of attaining a reduction in cost, such a system as to be capable of reception even if a crystal oscillator poor in precision is used, must be adopted. Therefore, the operation of performing synchronous tracking is required.

The above shows the basic operation of the receiver for UWB-IR communications, which receives pulse communications. That is, the antenna receives a radio wave for the pulse communications, the RF front-end section 210 extracts a shaped waveform of a required frequency, and the AD converter section 220 converts it to a digital signal. The baseband section 230 performs its digital signal processing and thereby takes out and outputs communication data.

In the present embodiment, the reception environment measuring section 240 and the parameter setting section 250 are used to enhance the performance of such a receiver. With the objective of performing reception in the optimum state in the UWB-IR communications, there is a need to set the gain, an offset correction voltage, the number of signals to be used (number of AD converters), a synchronous trapping threshold value and the number of synchronous confirmations to values matched with the reception environment. These parameters are set on the basis of the result of measurement of noise power. The measurement of the noise power is performed by the reception environment measuring section 240 shown in FIG. 2. As a result, the parameter setting section 250 determines required parameter values. In order to measure the noise power, the output signals 501 of the offset/gain adjustment unit 500 shown in FIG. 5 by way of example are used and these signals are inputted to the reception environment measuring section 240.

Figure 6:
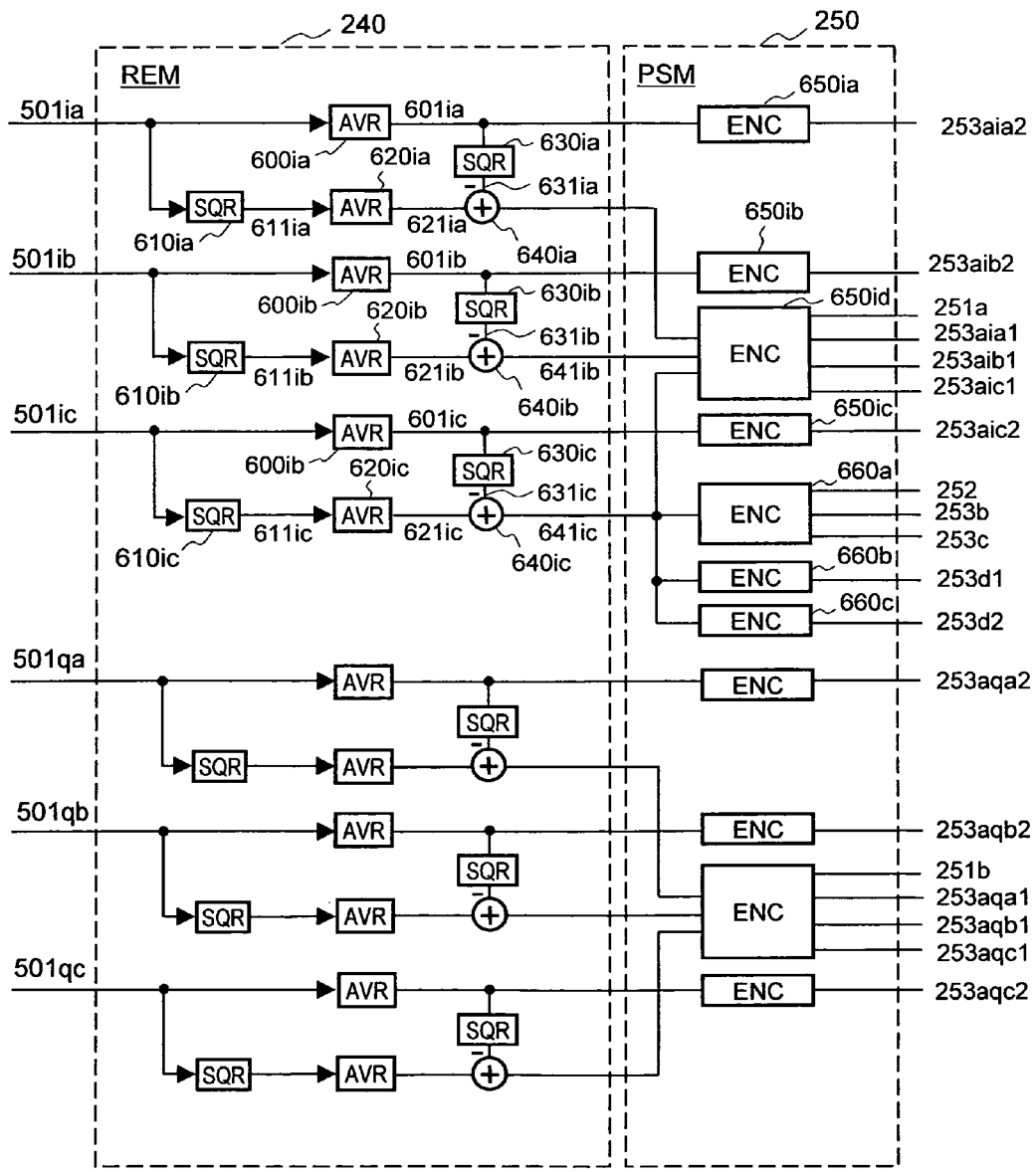
FIG. 6 is a circuit block diagram showing a configuration of a reception environment measuring section and a parameter setting section of the first embodiment.

FIG. 6 shows a block diagram illustrative of the reception environment measuring section 240 and the parameter setting section 250. The reception environment measuring section 240 measures the average and variance values of the I-component and Q-component signals 501 of the received signal divided into plural form, respectively. The average values are respectively obtained by collecting digital values of noise signals sampled in, for example, about 30-ns cycles in the form of 512 samples and averaging them by average circuits (AVR) 600. The variance values are respectively obtained by allowing adders 640 to subtract averaged and squared values from values obtained by raising the digital values of the signals to the second power by square circuits (SQR) 610 and averaging them.

These results of calculations are supplied to the parameter setting section 250 and encoded by encoders (ENC) 650 and 660 thereinside, from which various set parameters are outputted. The average values of the noise signals respectively indicate offsets and control signals $253a$ for optimizing the offsets (usually setting them to 0 or a center value) are supplied to the offset/gain adjustment unit 500. Since the offsets change depending upon the characteristics or the like of various circuit elements, which pass during a period up to the transmission of the signals to the baseband section 230, there is a need to compensate for them.

The variance of noise indicates the magnitude of the noise itself from the result of measurement of the noise. The magnitude of the received signal used for communication or each received-signal set value in the receiver can be determined from the value of each noise. In order to receive a signal having the optimum amplitude, the gain of each amplifier may be adjusted in such a manner that the magnitude of each noise in the receiver becomes the optimum value. As to coarse adjustments, the variable gain amplifiers 360 in the RF front-end section 210 are controlled by their corresponding control signals 251. As to fine adjustments, the offset/gain adjustment unit 500 of the baseband section 230 is adjusted in accordance with the control signals $253a$.

There may be a case in which upon optimizing the noise levels as described above, the optimization thereof is not complete depending upon conditions. Even in such a case or the optimized case, the number of signals to be used, the threshold values for synchronous trapping, the number of synchronous confirmations and the like are set according to the variance values each indicative of the magnitude of noise to thereby optimize receiving performance.

As to the number of signals to be used, the used number of AD converters 410 in the AD converter section 220 is adjusted by the corresponding control signal 252, and the used number of matched filter units 510 of the baseband section 230 is controlled by the corresponding control signal 253b. An internal circuit configuration of the input signal adjustment unit 520 is controlled by the corresponding control signal 253c. As to the threshold values for the synchronous trapping and the number of the synchronous confirmations, the threshold values and the number of conformations in the synchronous trapping unit 530 of the baseband section 230 are determined according to the corresponding control signal 253d.

Figure 7:
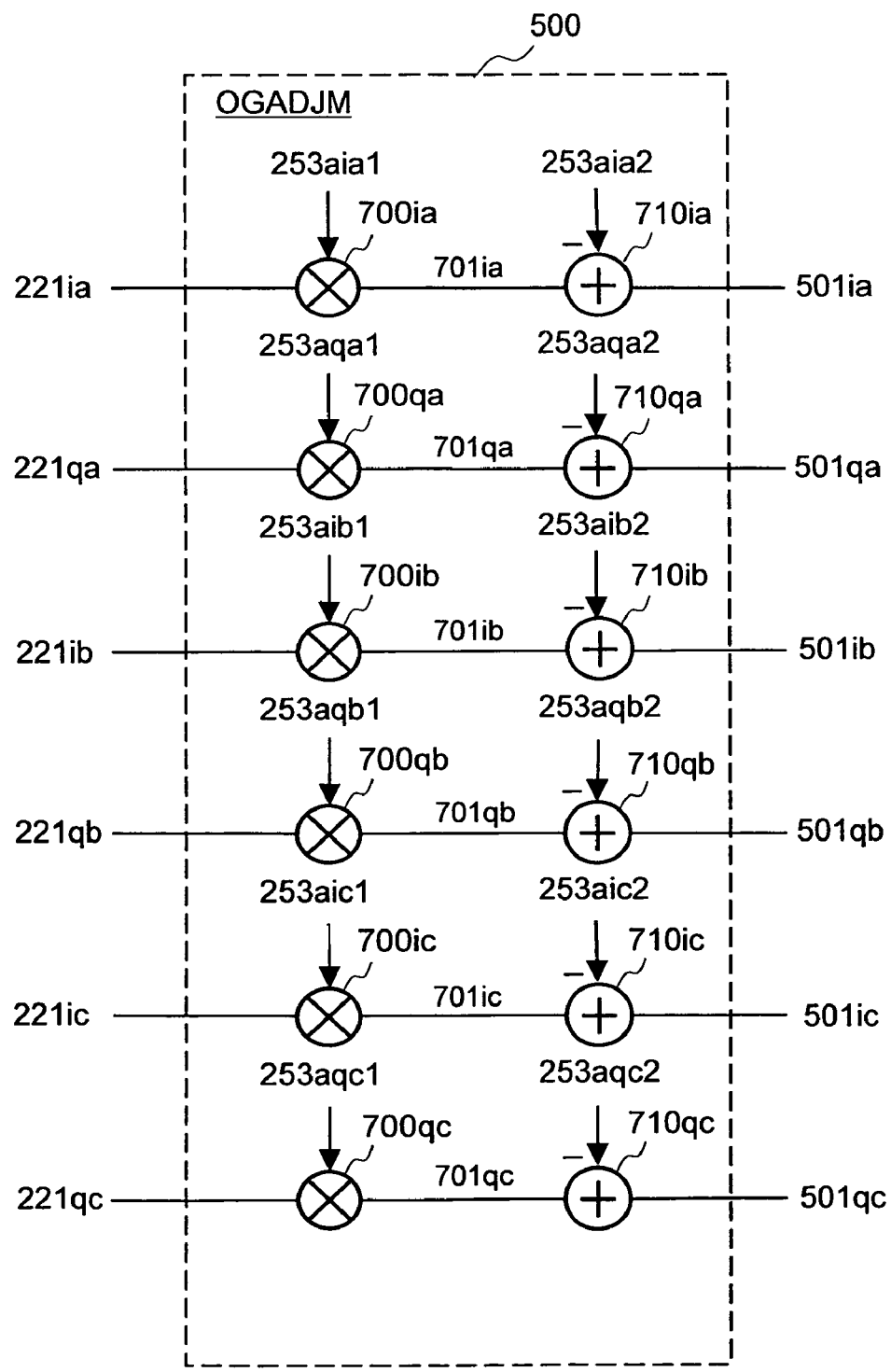
FIG. 7 is a circuit diagram showing a configuration of an offset/gain adjustment unit of the first embodiment.

As mentioned above, the gain of the signal is determined based on the variance value of each noise power. The gain is adjusted by utilizing the gain of each variable gain amplifier 360 of the RF front-end section 210 and the gain obtained as a result of the digital processing by the baseband section 230 in combination. The amplification at the digital processing is carried out by multipliers 700 in the offset/gain adjustment unit 500 shown in FIG. 7. In general, the interval of each settable gain is large in the case of the gain of each variable gain amplifier 360, and it is hard to be adjusted to the optimum gain. However, the gain of the variable gain amplifier can be set to the optimum gain by utilizing the gain adjustments at the digital processing in combination. The offset of each signal is adjusted by the corresponding adder-subtractor 710 at the offset/gain adjustment unit 500.

Further, variations in the gains of the variable gain amplifiers 360 for I and Q signals can be adjusted by independently measuring the noise power of the I and Q signals. Since the power of the transmission wave for the UWB-IR communication is low, each variable gain amplifier having large gain is required. Since the amplifiers each large in gain are generally large in gain variation, there is a need to correct the variations produced between such amplifiers to make an improvement in performance.

If the compensation for the variations between such amplifiers as described in the present embodiment is not done, then variations occur in the I and Q signals and proper phase information cannot be obtained, thus leading to degradation of receiving performance and an increase in bit error rate. Alternatively, when a shift occurs between the gains of the I and Q signals, the constellation of signals in an I/Q plane used upon signal demodulation is distorted, and the performance changes due to the magnitude of a shift between the phase of the carrier wave of the received signal and the phase of each local oscillator. That is, the performance changes for each communication.

Further, the introduction of the function of adjusting the variations in gain at the digital processing makes it possible to relax a request related to the accuracy of each of the parts such as the variable gain amplifiers, crystal oscillators, etc. and make a reduction in cost too.

The gain and the offset values vary due to variations in the performance of each AD converter 410 even though the same I and Q signals are inputted. This variation particularly influences the accuracy of synchronous tracking. On the other hand, since the noise power are measured with respect to all the input signals of the baseband section 230 to enable adjustments in gain and offset value in the present embodiment, the accuracy of synchronous tracking can be enhanced.

The number of signals (number of AD converters) to be used greatly influences receiving performance and operational power consumption. That is, when the number of the input signals (number of AD converters) is large, the power consumption is large but the receiving performance becomes high. On the other hand, when the number of the input signals is small, the power consumption is also low but the receiving performance is degraded too. Thus, although the receiving performance is enhanced with the increase in the number of input signals, the number of signals to be used is determined in view of the required performance and power consumption.

Figure 8:
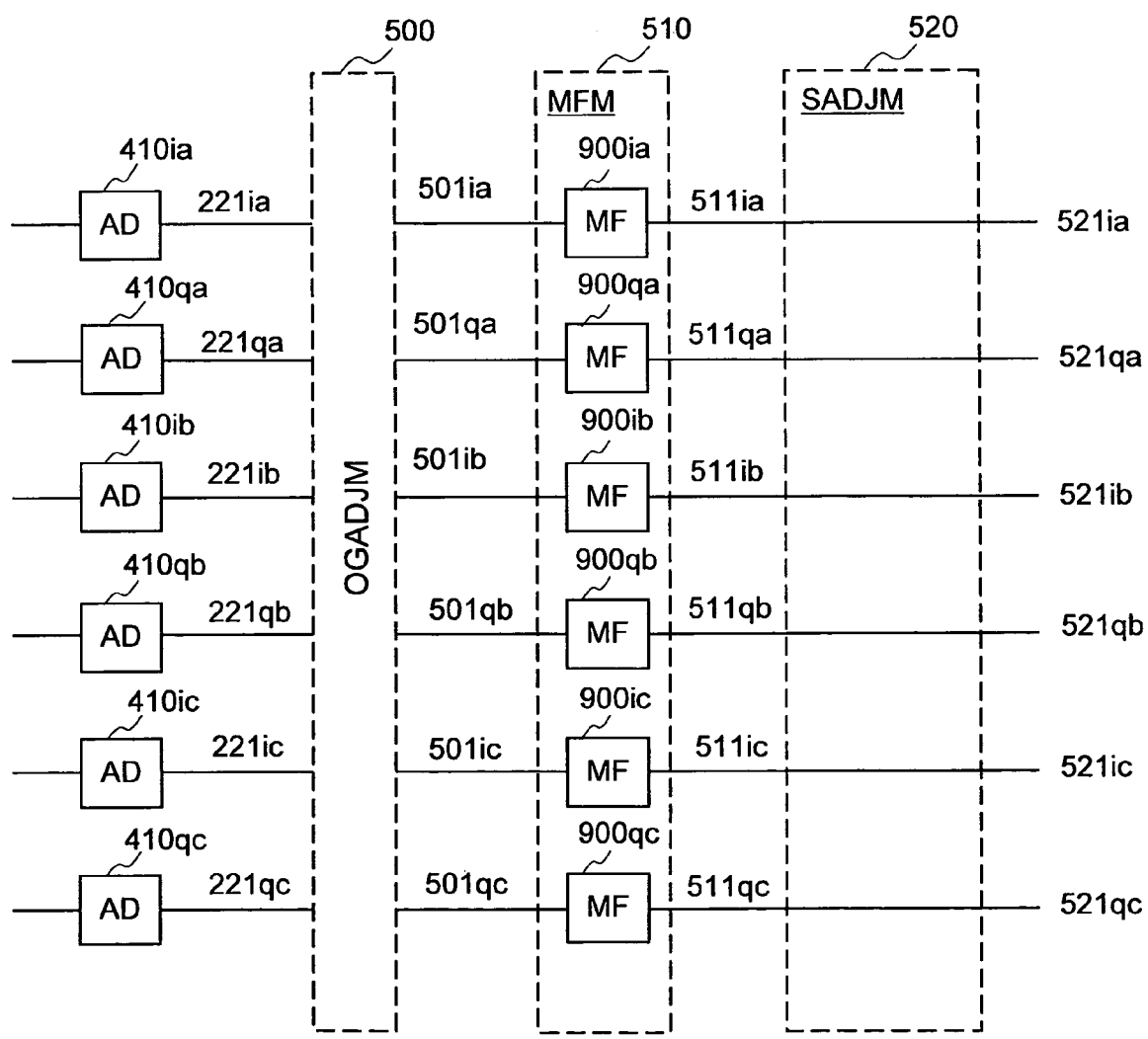
FIG. 8 is a diagram illustrating a configuration of an input adjustment section of the first embodiment.
Figure 9:
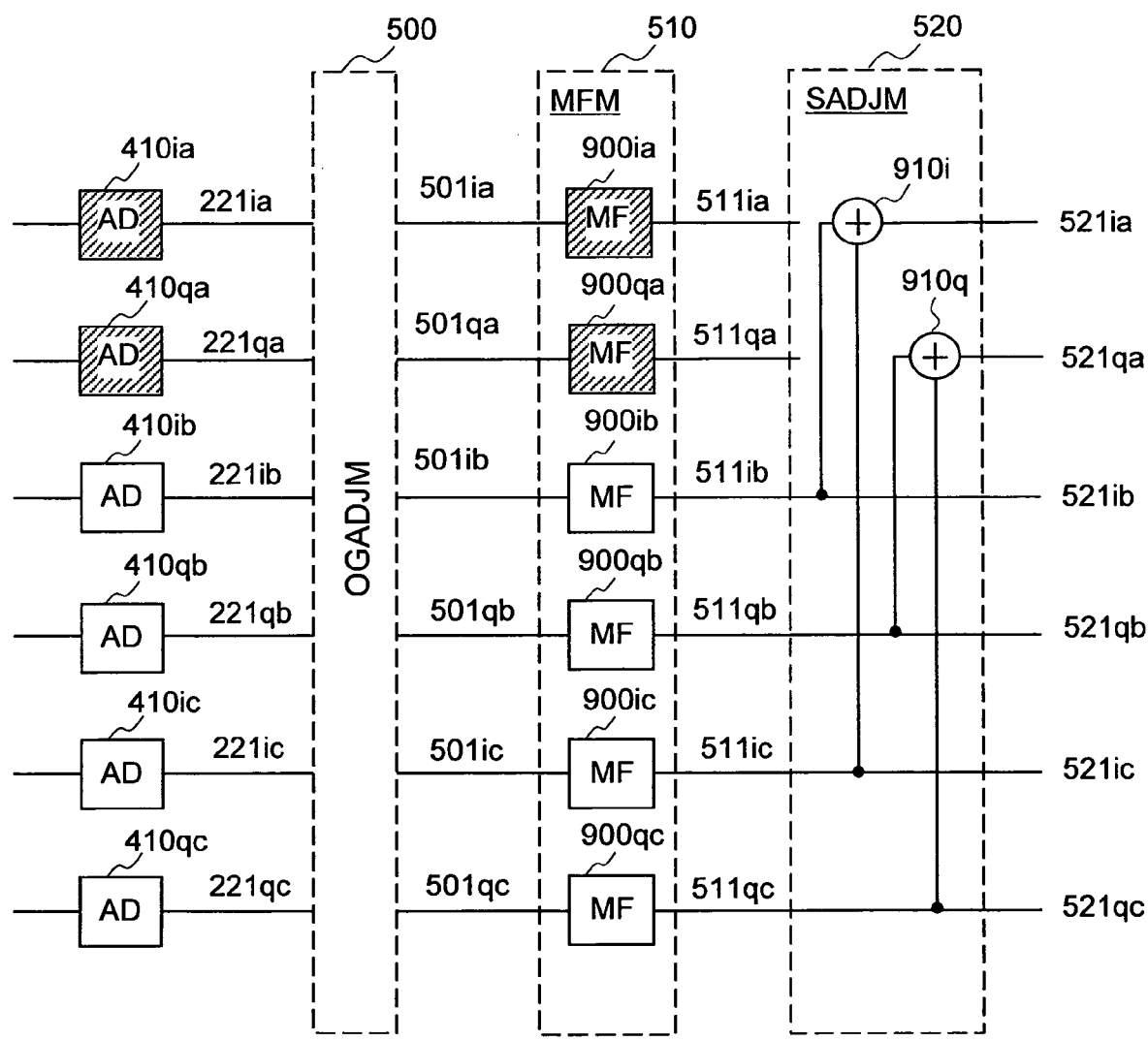
FIG. 9 is a diagram showing a configuration where the number of input signals in the input adjustment section shown in FIG. 8 is reduced.

When, for example, a high-precision communication or a measuring function is required, there is a need to sample pulses at plural points using a large number of AD converters 410. The receiving performance depends upon reception surrounding. The number of AD converters to be used is determined from the required performance and measured noise power, and power supplies for unnecessary AD converters and matched filters are blocked or cut off. As shown in FIG. 8, one matched filter is associated with one AD converter. When the number of signals to be used is small, for instance, it is not necessary to use AD converters 410ia and 410qa diagonally shaded as shown in FIG. 9, the signals are adjusted by the corresponding input signal adjustment unit 520 to prevent the occurrence of an influence on subsequent processing. Upon performing the synchronous tracking, the signals inputted to the synchronous tracking unit 570 result in plural I and Q respectively, and sync shifts are detected by changes in the magnitude thereamong. When the I and Q signals corresponding to the minimum number of input signals are respectively taken one signal by one signal, previously-sampled values and values sampled this time and next time are respectively stored, and the synchronous tracking is enabled by grasping time-sequential changes in the magnitude.

Figure 10:
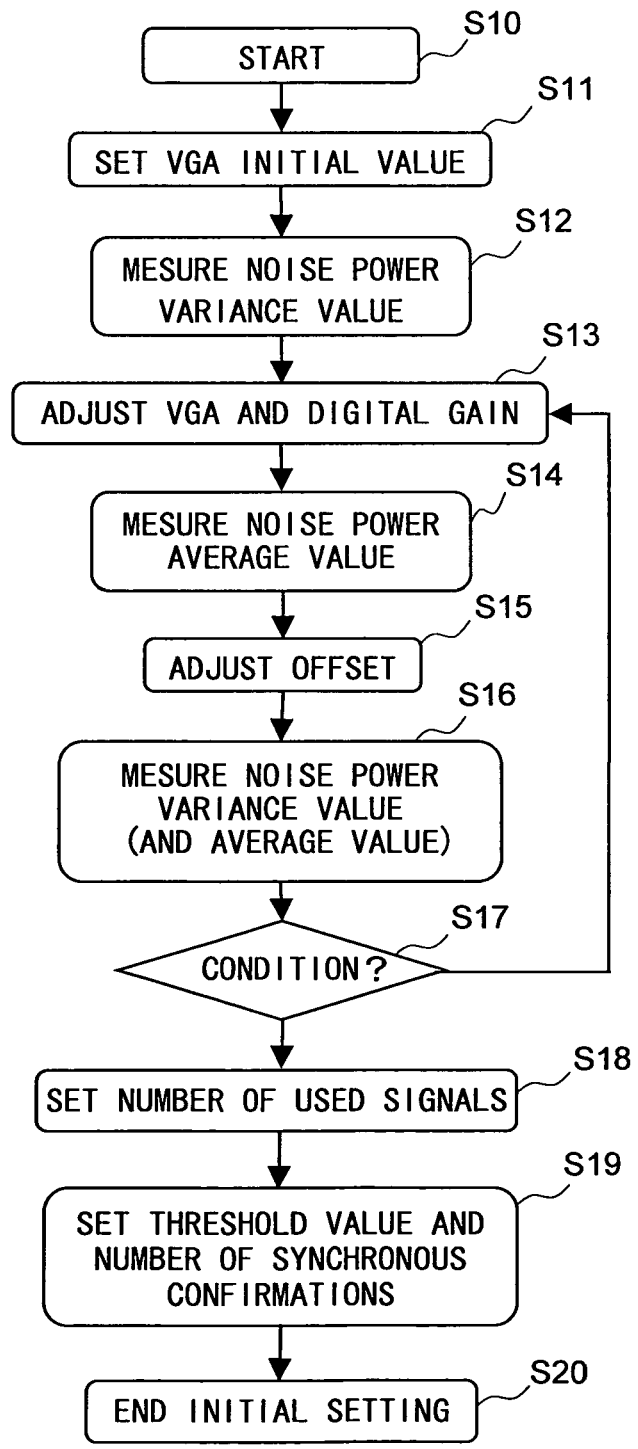
FIG. 10 is a flowchart showing a parameter setting procedure of the first embodiment.

FIG. 10 shows one example of a flowchart for setting parameters.

The receiver is first started up in Step S10.

In Step S11, the gain of each variable gain amplifier 360 of the RF front-end section 210 is first set to a suitable value. As the initial value of the variable gain amplifier, the previous value, the value set in advance and the like are set as needed.

Next, in Step S12, variance-value measurements on noise power are made to calculate noise-power variance values.

In Step S13, the gain of each variable gain amplifier and gain at digital processing are utilized in combination, and the gain of a received signal used in baseband signal processing is determined on the basis of the calculated values.

After the setting of the gain, the average value of the noise power is measured in Step S14 and each offset is corrected in Step S15.

In Step S16, the variance value (and average value) of the noise power are measured again.

In Step S17, the obtained result of measurement and the pre-set desired condition are judged. When the condition is met, the parameter setting procedure proceeds to Step S18, where the used number of signals is set based on the variance value of power consumption.

Further, the threshold value and the number of synchronous confirmations are set in Step S19, and initial setting or initialization is ended (Step S20).

When the condition is not met in Step S17 referred to above, the parameter setting procedure returns to Step S13 and Steps 13 through 17 are repeated. Incidentally, a method for setting the gain once and plural times and making offset adjustments once and plural times, repeatedly until a desired condition is met, can be selected.

Figure 24:
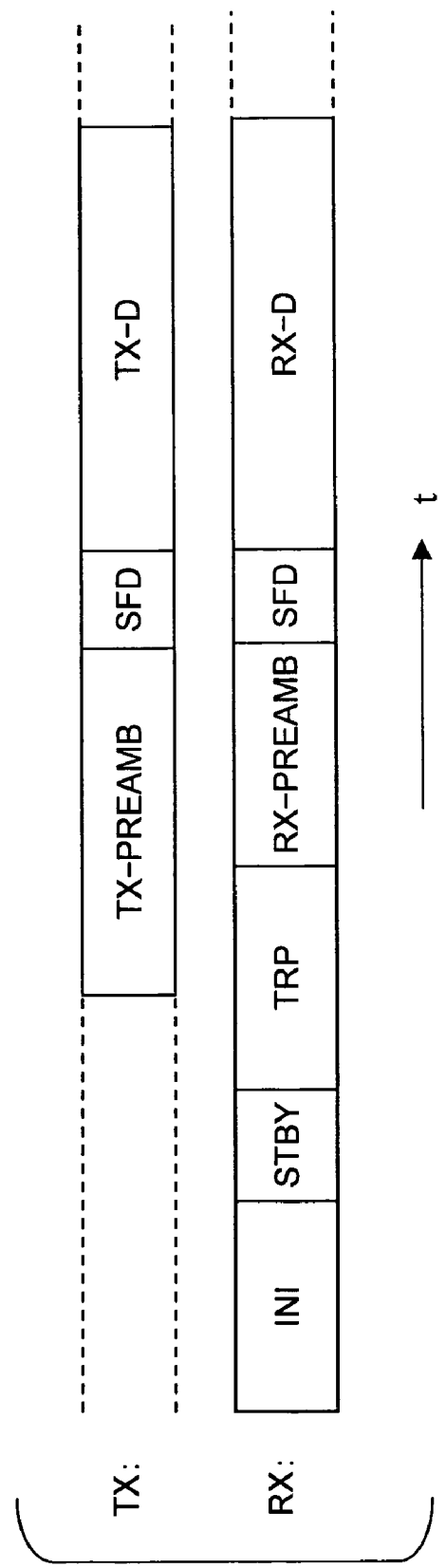
FIG. 24 is a diagram showing one example of an operation timing diagram of the receiver.

Here, one example of an operation timing diagram of the receiver is shown in FIG. 24. In the same drawing, TX shows a transmitting side and RX indicates a receiving side respectively. On the receiving side, parameters such as the gain of each VGA, etc. are optimally set upon the initial setting (INI). Synchronous trapping (TRP) is started as needed after standby (STBY). When the synchronous trapping is completed, the receiving side receives a preamble (RX-PRE-AMB) transmitted from the transmitting side (TX-PRE-AMB). After the detection of a frame start signal (SFD), the receiving side receives transmission data (TX-D) transmitted from the transmitting side (RX-D).

When, for example, 1-bit data is spread into 128 pulses and the interval between the adjacent pulses is assumed to be 30 ns, a signal's transmission rate results in about 260 kbps. When a preamble length of a transmission packet is assumed to be 20 bytes, for example, the time required for the preamble results in about 600 μs.

The time required to calculate the average and variance values of the noise power is dominant in the time taken to sample noise. When 512 samples are captured in 30-ns cycles, the time results in about 15 μs.

This time is much shorter than the time necessary for the preamble. However, the cycle in which the noise is sampled, is not necessarily identical to the pulse interval but may be different therefrom. When the pulse interval is of 30 ns, for example, noise may be sampled at slightly short intervals of 29 ns or long intervals of 31 ns. Incidentally, they may be different due to the following reasons.

When pulse signals are inputted at predetermined pulse intervals and cycles for sampling noise, i.e., sampling intervals are the same intervals as the pulse signals as shown in FIG. 20, signal components are continuously detected and noise components cannot be detected where the pulse signals are received and the timing provided to perform sampling happens to overlap with the peak of each pulse signal. However, even though the sampling timing happens to overlap with the peak of the pulse signal due to the slight shifting of the pulse signal and the sampling cycle as described above, the sampling timing is shifted from the peak of the pulse signal upon the following sampling. Thus, since the noise components are larger than the signal components if sampling values are averaged, the noise components can be detected.

The time required to set each parameter depends on the number of times loop processing is performed. The number of times required to set the gain and offset to the optimum values is normally three at most. That is, the time required to set each parameter is approximately 50 μs at most and is short by a single digit or so as compared with the time for the preamble. It can therefore be said that an increase in the operating time of the receiver due to the execution of the optimal setting is trivial.

The parameters can thus be set using the noise power and the synchronous trapping can be started based on settings corresponding to the reception environment. Thus, this can lead to increases in performance such as shortening of the synchronous trapping time, degradation in bit error rate, a reduction in out-of-sync rate, etc.

Second Preferred Embodiment

Figure 11:
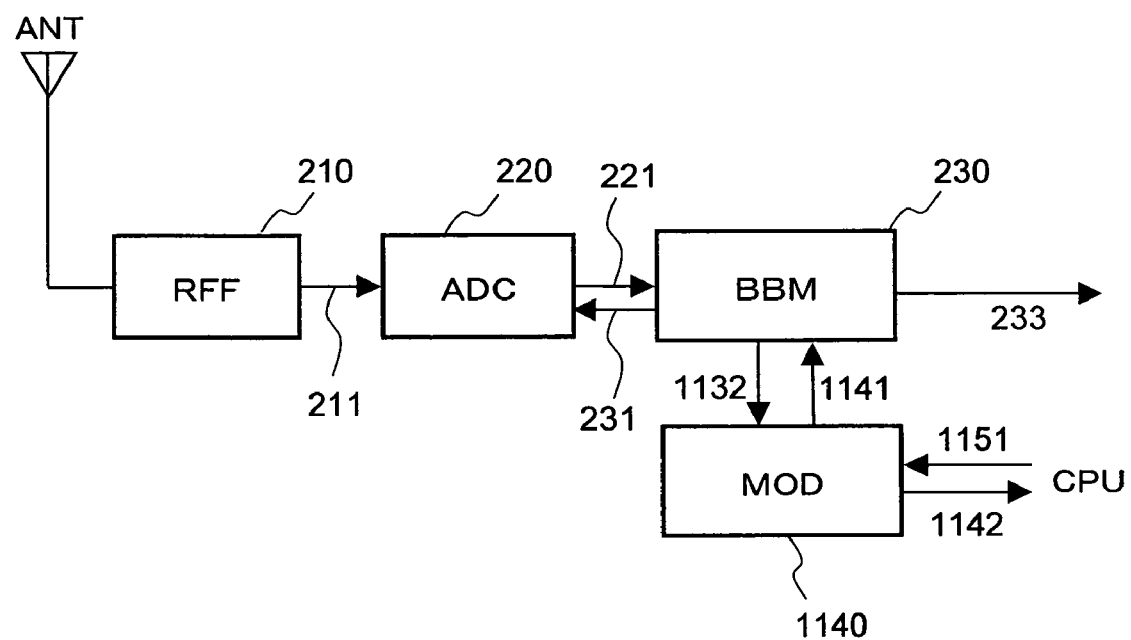
FIG. 11 is a circuit block diagram showing a second embodiment of a receiver according to the present invention.

FIG. 11 shows a configuration of a second embodiment of a receiver according to the present invention. The receiver according to the present embodiment comprises an RF front-end section (RFF) 210, an AD converter section (ADC) 220, a baseband section (BBM) 230, a mode controller (MOD) 1150 and an antenna (ANT). The antenna, the RF front-end section 210 and the AD converter section 220 respectively have functions similar to the first embodiment. The mode controller 1140 collectively controls operation modes of the baseband section 210.

Figure 12:
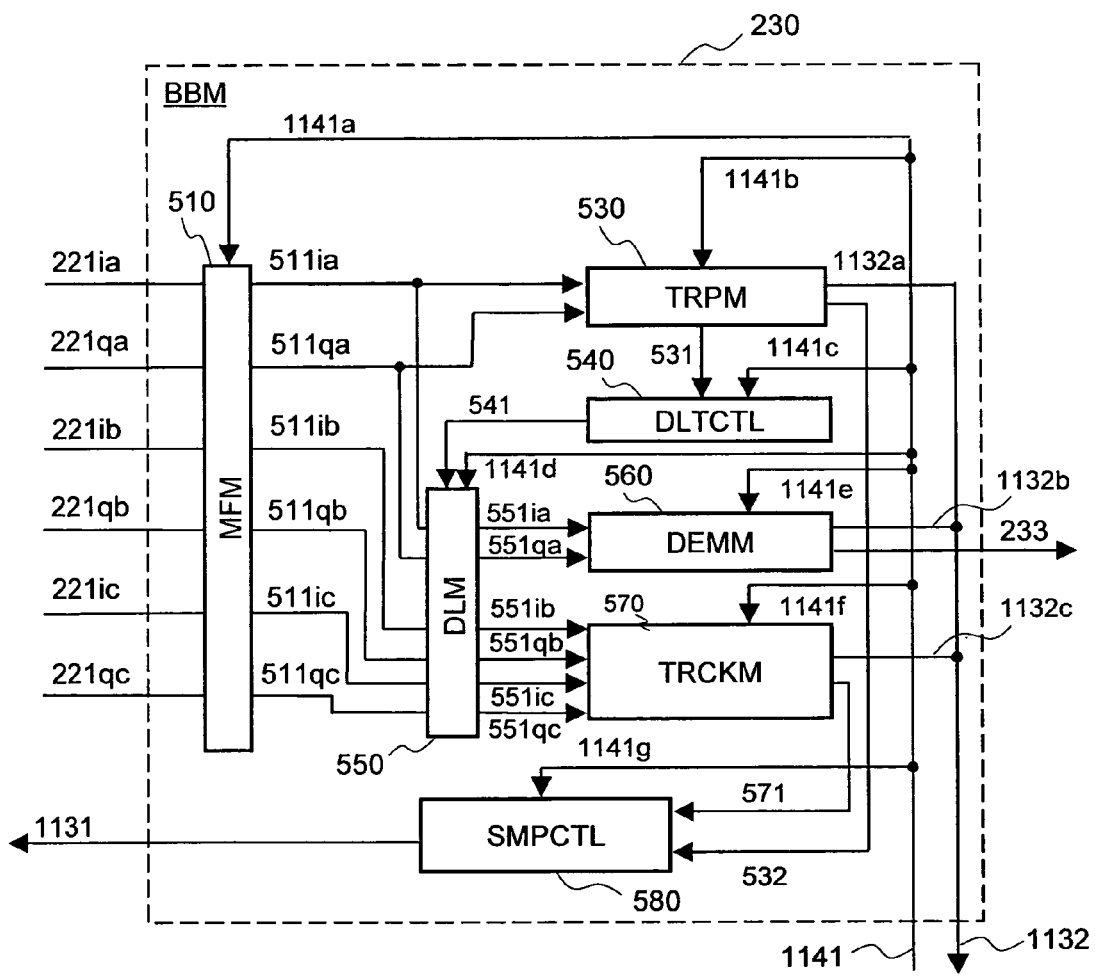
FIG. 12 is a circuit block diagram depicting a configuration of a baseband section of the second embodiment.

A configuration of the baseband section 230 and control signals (operating state control signals 1141 and mode control signals 1132) from the mode controller 1140 are shown in FIG. 12.

The mode controller 1140 is inputted with mode control signals 1132 outputted from respective blocks of the baseband section 230, e.g., a mode control signal 1132a outputted from a synchronous trapping unit 530, a mode control signal 1132b outputted from a demodulator 560, and a mode control signal 1132c outputted from a synchronous tracking unit 570 in FIG. 12. The mode controller 1140 makes a decision as to the following operating state in accordance with the mode control signals 1132 and supplies the operating state control signals 1141 (signals 1141a through 1141g in FIG. 12) to their corresponding blocks.

Figure 13:
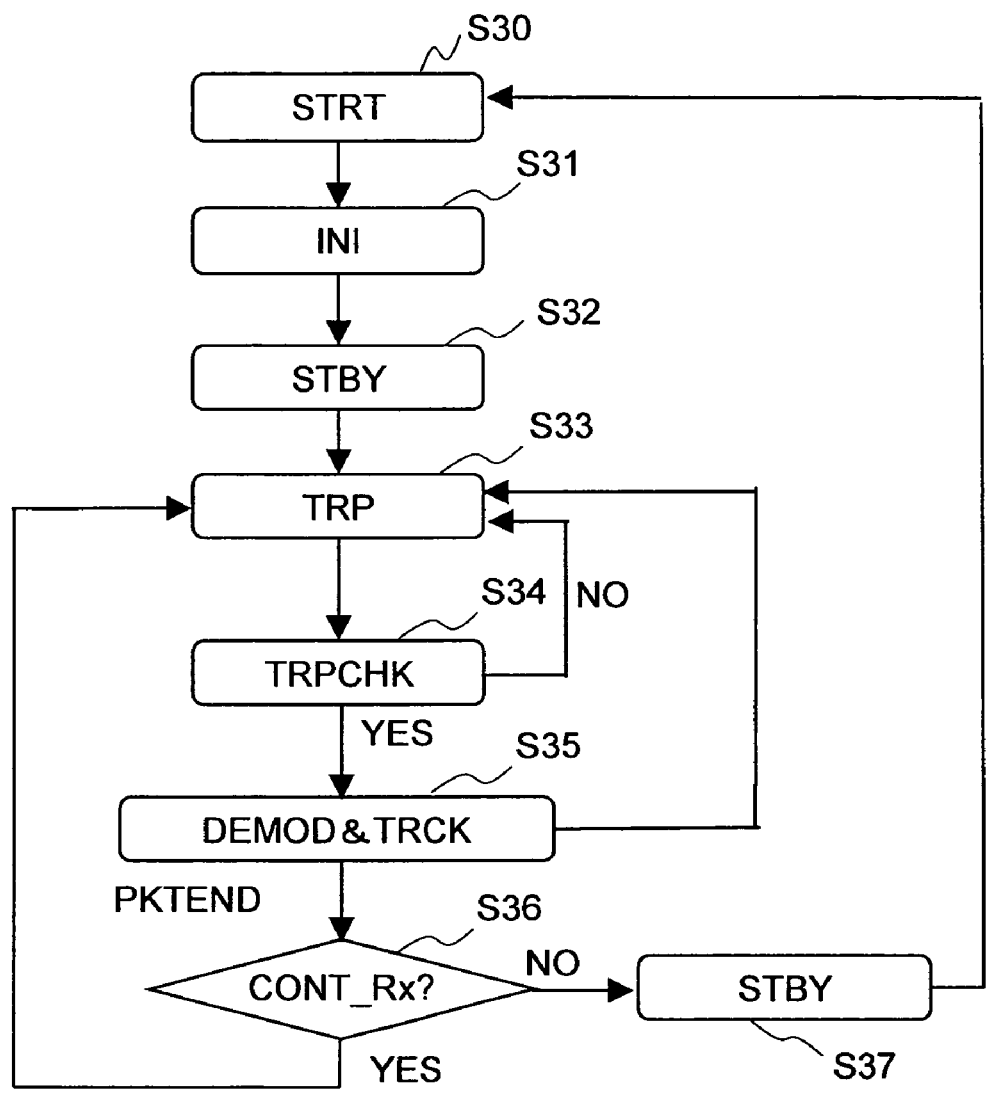
FIG. 13 is a flowchart illustrating a processing procedure of the receiver according to the second embodiment.

FIG. 13 shows an operational flowchart at reception. The mode controller 1140 batch-manages the baseband section 230 in accordance with the operational flowchart. The signals 1132 outputted from the respective blocks and the operation modes to be transitioned next are shown in FIG. 14. Incidentally, when a flag is "1" in FIG. 14, true is taken, whereas when the flag is "0" in FIG. 14, false is taken. "–" is assumed to be arbitrary.

A flow shown in FIG. 13 will be explained. When a reception start signal 1151 is inputted from an upper system other than the receiver, such as a CPU or the like to the mode controller 1140, the mode controller 1140 starts operating (STRT) (Step S30). The mode controller 1140 performs an initial setting (INI) operation for performing predetermined initialization (Step S31) and enters a standby (STBY) mode (Step S32).

Next, synchronous trapping (TRP) is carried out in Step S33 and synchronous confirmation (TRPCHK) is performed in Step S34. When the synchronous confirmation has failed, the mode controller 1140 returns to Step S34, where the synchronous trapping and the synchronous confirmation are performed again. When the synchronous confirmation can be done, the mode controller 1140 proceeds to Step S35, where demodulation and synchronous tracking (TRP & TRK) are carried out. Here, the synchronous tracking (TRK) operation becomes unnecessary if the frequency precision of each clock of the wireless or communication device is high or a communication time is short sufficiently as described above. The demodulation and synchronous tracking operations are performed till a packet end (PKTEND). Thereafter, the mode controller 1140 proceeds to a reception continuity decision (CONT_RX?) in Step S36. When the reception continues, the mode controller 1140 returns to Step S33 from which similar operations are repeated and the following packet is received. When the reception is discontinued, the mode controller 1140 proceeds to Step S37 where it enters a standby mode and is placed in a standby state until the corresponding start signal is inputted from outside.

On the other hand, when a synchronous tracking error or an SFD error is detected during the demodulation and synchronous tracking in Step S35, the mode controller 1140 returns to the synchronous trapping mode of Step S33, from which the procedure is redone.

Incidentally, the mode controller 1140 may proceed to the synchronous trapping mode of Step S33 from Step S31 without entering the standby mode of Step S32. When the synchronous confirmation of Step S34 is unnecessary, it is needless to say that the mode controller 1140 may proceed from Step S33 to Step S35.

A synchronous trapping completion flag (TRP_F) 1132a1, a synchronous confirmation completion flag (TRPCHK_F) 1132a2 and a synchronous confirmation error flag (TRPCHK_ERF) 1132a3 are outputted from the synchronous trapping unit 530 as shown in FIG. 14. Incidentally, although one signal line of 1132a is merely shown as viewed from the synchronous trapping unit 530 in FIG. 12, three signal lines of the 1132a1 through 1132a3 referred to above extend out in parallel. The number of signal lines is not limited to three. It is needless to say that the signal lines corresponding to the number as needed are provided. Signal lines outputted from other blocks are also similar to above.

An SFD (Start of Frame Delimiter: frame start signal) detection error flag (SFD_ERF) 1132b1 and a packet end flag (PKTEND_F) 1132b2 are outputted from the demodulator 560. An out-of-sync flag (TRP_EXF) 1132c is outputted from the synchronous tracking unit 570. The respective flags are inputted to the mode controller 1140.

The operation will further be explained with reference to FIG. 14. FIG. 14 shows a mode control signal (MODCTL) as viewed transversely and an operation mode (OP_MOD) as viewed vertically. Signs in the parentheses respectively indicate their corresponding control signal lines (which share their signals too) shown in FIG. 12.

When the mode controller 1140 receives the reception start signal 1151 therein, it makes a transition from the standby (STBY) mode to the synchronous trapping (TRP) mode. Thereafter, when "1" of the synchronous trapping completion flag (TRP_F) is set on the signal line 1132a1, the mode controller 1140 proceeds to the synchronous confirmation (TRPCHK) mode.

When "1" of the synchronous confirmation completion flag is set on the signal line 1132a2 in a synchronous confirmation mode, the mode controller 1140 proceeds to a demodulation (DEMOD) mode. When "1" of the synchronous confirmation error flag (TRP_ERF) is set on the signal line 1132a3, the mode controller 1140 clears the respective flags and returns to the synchronous trapping (CLR&TRP) mode.

When the SFD detection error flag (SFD_ERF) is set on the signal line 1132b1 and "1" is set on the out-of-sync flag in a demodulation and synchronous tracking (DEMOD&TRCK) mode, the mode controller 1140 clears the respective flags and proceeds to the synchronous trapping mode. When the packet end flag (PKTEND_F) is set on, the mode controller 1140 sends the demodulated data information to the upper system other than the receiver, such as the CPU or the like and is cleared by a control signal outputted from the upper system such as the CPU or the like, after which it is transitioned to the synchronous trapping mode (CLR&TRP) or standby (STBY) mode.

All the functions in the baseband section are not always necessary upon the respective operation modes. There are also functions needed to operate in a plurality of operation modes. Thus, the baseband section is separated into suitable blocks and their operating states (on/off) are controlled, thereby enabling a further reduction in power consumption. The baseband section of the present embodiment is configured so as to be separated into the blocks each allowed to have a suitable function so as to enable a reduction in power consumption.

A data holding timing controller (DLTCTL) 540 of the baseband section shown in FIG. 12 is constituted of a reset counter, for example. A reset signal 531 is outputted from the synchronous trapping unit 530 and serves so as to supply the output 541 of the counter to a data holding unit 550. The data holding unit 550 holds an input signal 521 sent from an input signal adjustment unit 520 with its timing and performs demodulation and synchronous tracking using the held data. Thus, the data holding timing controller 540 is operated in the three modes of the synchronous trapping mode, synchronous confirmation mode and demodulation mode. By mode-controlling the data holding timing controller 540 as an independent block, for example, the synchronous trapping unit 530 can be deactivated in the demodulation mode.

FIG. 15 shows operating/non-operating states of the respective function blocks (BLK) in the respective operation modes (OP_MOD). In FIG. 15, o indicates the operation, □ indicates that the input signal and the clock are off and x indicates a power-off, respectively. The inside in [ ] indicates operating/non-operating states where no synchronous tracking is done. Numerals in parentheses indicate reference numerals of their corresponding functional blocks shown in FIG. 12.

The operating/non-operating states are controlled by the corresponding mode control signal 1132 outputted from the mode controller 1140. As a method for controlling it, a method can be selected wherein a circuit comprised of, for example, a switch transistor SWT, two AND circuits 1 and 2 and a decoder DEC inputted with a mode control signal 1141 is provided in each block as shown in FIG. 16 to thereby stop a clock input CLK and stop a signal input IN for cutting off a power supply VDD.

Figure 16:
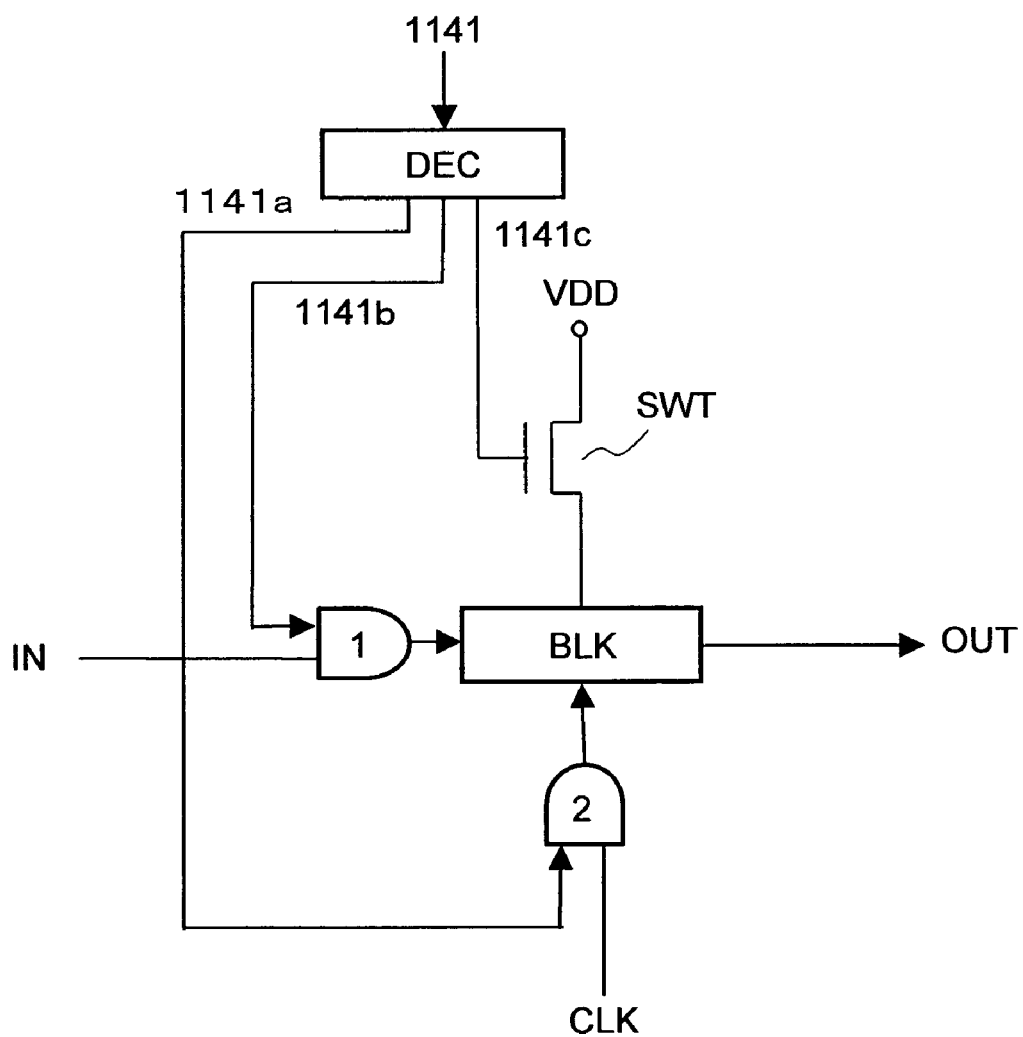
FIG. 16 is a diagram illustrating one example of a circuit for bringing the respective blocks to the non-operating state, respectively, in the second embodiment.

Although such a configuration that the ANDing of the operating state control signal 1141 for controlling the operation/non-operation and the input signal IN to each block is taken, is shown in FIG. 16, no restriction is imposed on it. Although no power is consumed if the power supply is cut off, time is taken until it is reset. Although the method for cutting off the input of the clock and the signal needs power consumption equivalent to a leak current, power is reduced as compared with the operating state and time is hardly taken for resetting. These methods for controlling the operating/non-operating states can be used properly according to conditions.

If a crystal oscillator high in precision is used in each of the transmitter and receiver, then the synchronous tracking may not be done although it becomes expensive. Alternatively, when a data transfer rate is high and a frame length of data is short, i.e., even when the time necessary for sending and receiving is short, there is no need to perform the synchronous tracking. Control on the operating/non-operating states where no synchronous tracking is done is indicated by [x] in FIG. 15.

Thus, the baseband section 230 is divided into the blocks each having the suitable function and the operating/non-operating states of each block are controlled according to the operation modes, thus making it possible to realize a reduction in power consumption of the receiver.

Figure 28:
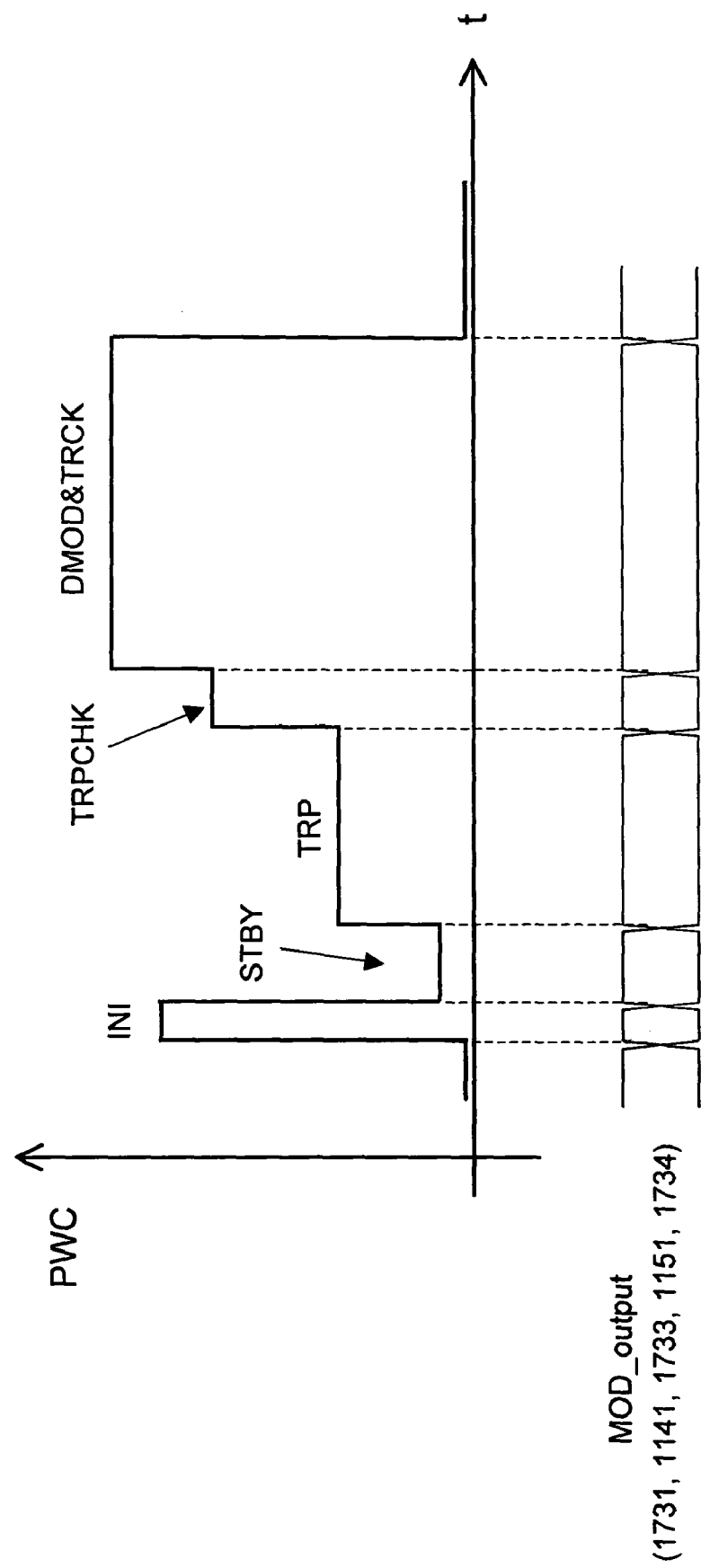
FIG. 28 is a diagram showing one example of power consumption of the receiver at its receiving operation according to the second embodiment.

Here, one example of power consumption of the receiver at its receiving operation is shown in FIG. 28. In FIG. 28, the horizontal axis indicates time (t). The vertical axis indicates power consumption (PWC). Reference numeral 1151 indicates a start signal sent from the CPU, and reference numerals 1731, 1141, 1733 and 1734 indicate operation mode (OP_MOD) setting signals sent from the mode controller (MOD) 1140.

When the reception start signal 1151 is inputted to the mode controller, it starts operating and performs a parameter initial setting (INI) operation to raise power consumption. When the mode controller enters the standby state (STBY) mode after completion of the initial setting, power consumption becomes very low. The operations/non-operations of the respective parts are hereinafter controlled by the synchronous trapping (TRP) mode, synchronous confirmation (TRPCHK) mode, demodulation and synchronous tracking (DEMOD&TRK) mode and standby mode again, and respective setting signals. Therefore, power consumption changes depending upon the operating states as shown in the same figure in the present embodiment. Incidentally, a change in power consumption is similar even to a third embodiment to be described later.

Third Preferred Embodiment

Figure 17:
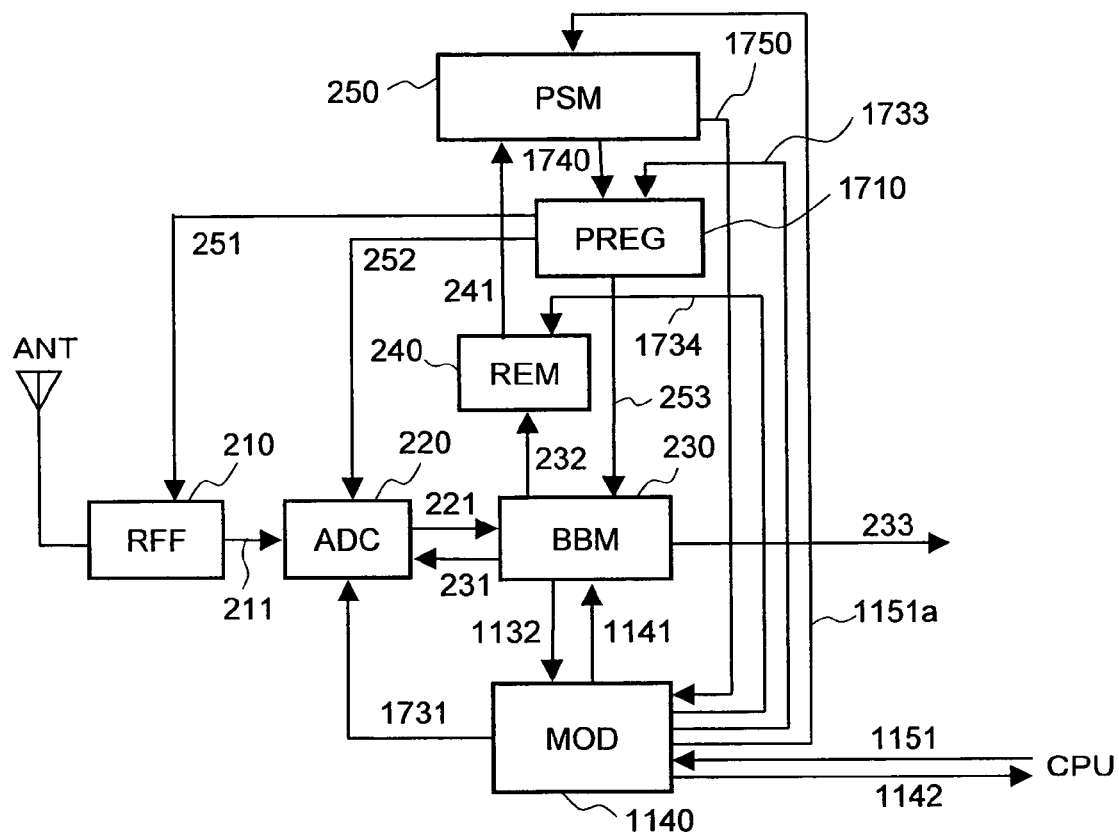
FIG. 17 is a circuit block diagram showing a configuration of a third embodiment of a receiver according to the present invention.

FIG. 17 shows an overall configuration of the third embodiment illustrative of a receiver according to the present invention. The receiver of the present embodiment combines both functions of the first embodiment and the second embodiment. The receiver comprises an antenna ANT, an RF front-end section (RFF) 210, an AD converter section 220, a baseband section (BBM) 230, a reception environment measuring section (REM) 240, a parameter setting section (PSM) 250, a mode controller (MOD) 1140 and a parameter storage or register (PREG) 1710. When the receiver combines the functions of the first embodiment and the second embodiment, there is a need to store set values of the parameter setting section (PSM) 250 in the present embodiment. The parameter register 1710 is added. Each parameter set value is stored in the parameter register 1710 via a signal line 1740.

The antenna 200, the RF front-end section 210, the AD converter section 220, the reception environment measuring section (REM) 240 and the parameter setting section 250 respectively have functions similar to the first embodiment. The mode controller 1140 performs control on the AD converter section 220 via a signal line 1731, control on the reception environment measuring section 240 via a signal line 1734, control on the parameter setting section 250 via a signal line 1733 and control on the parameter register 1710 in addition to control on respective blocks of the baseband section 230 via signal lines 1132 and 1141.

FIG. 18 shows mode control signals 1132 supplied from the respective parts to the mode controller 1140 and operation modes (OP_MOD) to which the receiver is transitioned next. When a set start signal 1151a is inputted to the mode controller 1140 from an upper system other than the receiver, such as a CPU or the like, the parameter setting section 250 starts the setting of respective parameters on the basis of a data signal 241 of noise power measured by the reception environment measuring section 240 (PS_STRT) and performs the parameter setting during an initial setting (INI) mode. At the end, the parameter setting section 250 transmits a parameter setting completion flag (PSET_F) "1" to the mode controller 1140 via a signal line 1750. If a reception start signal 1151b is not yet supplied from the upper system other than the receiver, such as the CPU or the like, then the receiver is transitioned to a standby state (STBY) once.

When the reception start signal 1151b is inputted from the upper system other than the receiver, such as the CPU or the like, the receiver proceeds to a synchronous trapping (TRP) mode. Thereafter, when a synchronous trapping completion flag (TRP_F) is set, the receiver proceeds to a synchronous check or confirmation (TRPCHK) mode. When a synchronous confirmation completion flag (TRPCHK_F) is set in the synchronous confirmation mode, the receiver proceeds to a demodulation (DEMOD) mode. "1" is set on a synchronous confirmation error flag (TRPCHK_ERF), the receiver clears the respective flags (CLR) and returns to the synchronous trapping (TRP) mode.

When "1" is set on an SFD detection error flag (SFD_ERF) and an out-of-sync (TRP_ERF) flag in the demodulation mode, the receiver clears the respective flags and proceeds to the synchronous trapping mode. When "1" is set on a packet end flag (PKTEND), its demodulation data information is sent to the upper system other than the receiver, such as the CPU or the like. The receiver proceeds to the synchronous trapping mode or standby mode in accordance with a control signal sent from the upper system other than the receiver, such as the CPU or the like again.

The mode controller 1140 selects the corresponding AD converter to be operated by the control signal 1731 on the basis of a used-number-of-signals setting signal 252 inputted from the parameter register 1710 to the AD converter section 220.

FIG. 19 shows operating/non-operating states of the respective blocks in the respective operation modes. As to symbols ○, □ and x, ○ indicates the operation, □ indicates that the input signal and the clock are off and x indicates a power-off, respectively. The inside in [ ] indicates operating/non-operating states where no synchronous tracking is done. Numerals in parentheses indicate reference numerals of their corresponding blocks shown in FIGS. 5 and 17.

The operating/non-operating states are controlled by the corresponding mode control signal 1132 outputted from the mode controller 1140. As a method for controlling it, the method can be selected wherein the power supply is shut off, the clock input is stopped and the signal input is stopped as described in FIG. 16 in the second embodiment. Upon the parameter setting, the AD converter section 220, the reception environment measuring section 240, the parameter setting section 250 and the parameter register 1710 are operated. Providing the means 1710 for storing the parameters as in the present embodiment makes it possible to stop the operating parts using the set parameters, whereby power consumption is reduced.

When the synchronous tracking is not necessary as in the cases where, for example, a packet length is short, the precision of each of oscillators for the transmitter and receiver is high and a frequency deviation is small, a synchronous tracking unit is deactivated. This is equivalent to signs in [ ] shown in FIG. 19.

When three AD converters for I and Q signals are used, the outputs of AD converters 410 set one by one with respect to the I and Q signals are used when the synchronous trapping mode is taken. That is, the outputs of other AD converters are not used in the synchronous trapping mode. Thus, power consumption of the receiver can further be reduced by cutting off the clocks and input signals of the AD converters and matched filters. When the number of division of the I and Q signals is changed according to communication circumstances in addition to above, a further reduction in power consumption is enabled by controlling the number of operations of the AD converters 410.

Fourth Preferred Embodiment

Figure 25:
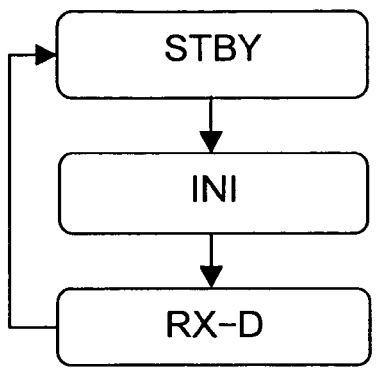
FIG. 25 is an operation flowchart of a receiver according to a fourth embodiment.

FIG. 25 shows an operational flowchart employed in a fourth embodiment of a receiver according to the present invention. When a start signal (not shown) is inputted from outside, the receiver of the present embodiment proceeds from a standby mode (STBY) to an initial setting mode (INI) for performing initialization, in accordance with FIG. 25 and executes a parameter optimum setting operation. Thereafter, the receiver enters a data reception (RX-D) mode for receiving transmitted data. When the receiver has completed its data reception, it enters into a standby mode again. This series of operations are repeated.

That is, the receiver of the present embodiment always measures noise power before execution of a receiving operation subsequent to synchronous trapping (TRP) and performs the optimum setting of each parameter (INI). Therefore, the reception at the optimum state is always allowed. Since, however, this setting is done for each reception, the time for the setting is needed every time. However, this control is useful where a change in ambient surrounding is large and high reliability is required, for example. Incidentally, the control of the present embodiment can be applied even to the receivers of the first and third embodiments.

Fifth Preferred Embodiment

Figure 26:
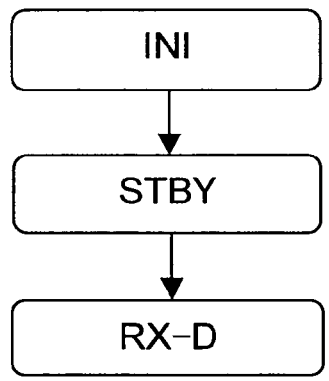
FIG. 26 is an operation flowchart of a receiver according to a fifth embodiment.

FIG. 26 shows an operational flowchart employed in a fifth embodiment of a receiver according to the present invention. The receiver executes an initial setting mode (INI), performs parameter optimum setting and retains each parameter set to the optimum in a memory device such as a flash memory or the like. Thereafter, the receiver proceeds to a standby mode (STBY). When a start signal (not shown) is inputted from the outside, the receiver proceeds from the standby mode to a data reception mode (RX-D), where it receives data therein.

That is, the parameter's optimum setting (INI) is performed upon initial operations at the installation of the receiver and the shipment thereof from a factory, for example, in the present embodiment. Each once-set parameter is retained in a nonvolatile memory such as the flash memory used as a read-only memory (ROM). The receiver performs reception using the parameter every time.

Although the reception at the optimum setting cannot be done where ambient surrounding changes, because the setting for each reception is not done in the present embodiment, the time for the subsequent setting becomes unnecessary. That is, the present embodiment has the advantage that the first or initial parameter optimum setting may simply be done. This control is useful where the receiver is being deactivated after the setting and noise surrounding remains unchanged. Incidentally, the control of the present embodiment can be applied even to the receivers of the first and third embodiments.

Sixth Preferred Embodiment

Figure 27:
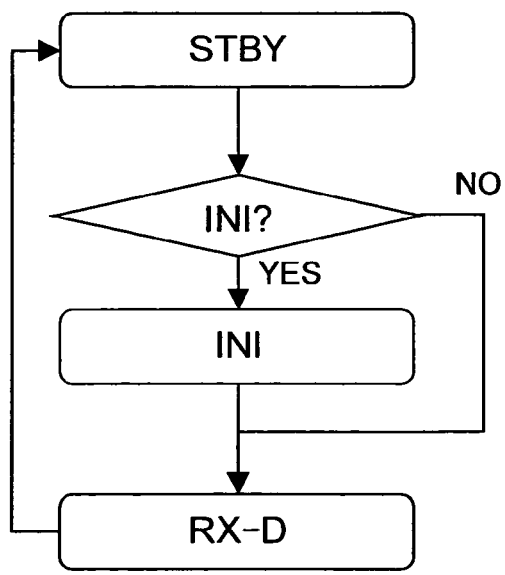
FIG. 27 is an operation flowchart of a receiver according to a sixth embodiment.

FIG. 27 shows an operational flowchart employed in a sixth embodiment of a receiver according to the present invention. When a start signal (not shown) is inputted from outside in a standby state (STBY), the receiver of the present embodiment makes a condition decision (INI?) as to whether it should perform parameter optimum setting from a standby mode (STBY) in accordance with FIG. 26. When the answer is found to be NO, the receiver performs reception (RX-D) of data using predetermined parameters. When the data reception is completed, the receiver enters the standby mode again. On the other hand, when the answer for the condition decision (INI?) is found to be YES, the receiver performs the optimum setting of each parameter (INI) and carries out the data reception (RX-D) using each optimum parameter.

That is, the present embodiment performs the optimum setting of each parameter according to conditions. Here, the conditions means, for example, time, a change in surrounding, etc. As one example in which settings are performed with the time as the condition, there is known one in which settings are performed in a 1-hour or 1-week cycle. Such control is a method useful, for example, where the receiver is used under such a circumstance that a daily change and a seasonal change occur. As a method, for performing settings according to a change in surrounding, there is known, for example, one in which the change in surrounding is recognized using a sensor. As the sensor, may be used, for example, a temperature sensor, a moisture sensor, an acceleration sensor or a sensor for measuring a noise level, or the like. Although the sensor for recognizing the change is necessary in addition to the receiver, there is no need to perform the setting of each parameter where no change in surrounding occurs. This is a method useful where a change in surrounding suddenly occurs and its change cannot be estimated. Incidentally, the control of the present embodiment can be applied even to the receivers of the first and third embodiments.

What is claimed is:

1. A receiver that receives each of pulse signals spread by spread codes, comprising:
an RF front-end section which performs filtering and amplification on each received signal;
an AD converter section which analog-digital converts signals outputted from the RF front-end section;
a baseband section which inversely spreads the output of the AD converter section and performs signal detection and demodulation thereon;
a reception environment measuring section which measures reception environment constituted by components of the receiver using signals inputted to the baseband section; RF front-end, the AD converter and the baseband section of the receiver; and
a mode controller for controlling operation modes of the baseband section, the AD converter section, the reception environment measuring section, and the parameter setting section, and
a parameter register for storing the set parameters of the parameter setting section,
wherein the baseband section includes plural blocks and control circuit units provided in each of the respective blocks,
wherein, in the operation modes, there are a standby state mode, an initial setting mode, and a data reception mode,
wherein, when the initial setting mode, the reception environments are measured by the reception environment measuring section using signals inputted to the baseband section prior to a start of a receiving operation of receiving said each of pulse signals; wherein parameters for each section of the receiver are set on the basis of output signals of the reception environment measuring section;
wherein, when the receiver enters the data reception mode, said pulse signals are received, and
wherein operating/non-operating states of the respective blocks in the baseband section are respectively controlled by control circuit units provided in each of the respective blocks according to the operation modes.

2. The receiver according to claim 1,
wherein, when a set start signal is inputted to the mode controller from an upper system other than the receiver, the parameter setting section starts the setting of respective parameters on the basis of a data signal of noise power measured by the reception environment measuring section and performs the parameter setting during an initial setting mode.

3. The receiver according to claim 1,
wherein the data reception mode includes a synchronous trapping mode and a demodulation mode,
wherein, when a reception start signal is inputted from an upper system other than the receiver, the receiver proceeds to the synchronous trapping mode, and when the synchronous trapping mode complete, the receiver proceeds to the demodulation mode.

4. The receiver according to claim 1,
wherein the AD converter section includes a plurality of AD converters,
wherein the input signals divided into plural form by the AD converter section are analog-digital converted by the plurality of AD converters, and
wherein a number of the AD converters used upon the receiving operation is set as one of said parameters by the parameter setting section prior to the start of the receiving operation.

5. The receiver according to claim 1,
wherein each control circuit unit includes
a power cutoff circuit;
a clock input stop circuit; and
a signal input stop circuit for controlling the operating/non-operating states of each block in the baseband section, and wherein at least one of the power cutoff circuit, the clock input stop circuit, and the signal input stop circuit is selected by the mode controller.

6. The receiver according to claim 1,
wherein, when a start signal is inputted from outside in the standby state, the receiver makes a condition decision as to whether it should perform parameter optimum setting from the standby mode, then, when the answer is no, the receiver performs the data reception mode using predetermined parameters, and when the data reception is completed, then the receiver enters the standby mode again, and
wherein, when the answer for the condition decision is yes, the receiver performs the initial setting mode for setting the optimum parameters, and carries out the data reception using each of optimum parameters.

7. The receiver according to claim 6,
wherein the parameter setting section performs the optimum setting parameters according to time.

8. The receiver according to claim 6,
wherein the parameter setting section performs the optimum setting according to a change of the reception environment in surrounding recognized by using a sensor.

9. The receiver according to claim 1, further comprises a parameter register for holding set parameters,
wherein, upon the parameter setting, the AD converter section, the reception environment measuring section, the parameter setting section and the parameter register are operated, and after the parameter setting, the operating parts are stopped.

10. The receiver according to claim 1,
wherein one of the plural blocks of the baseband section is a synchronous trapping unit,
wherein the data reception mode includes a synchronous trapping mode and a demodulation mode,
wherein, at the standby state mode and the initial setting mode, said control circuit units set the respective blocks of the baseband section non-operating states, and
wherein, at the synchronous trapping mode of the data reception mode, set the synchronous trapping unit operating state, and at the demodulation mode, set input signal and clock of the synchronous trapping unit are off state.

11. The receiver according to claim 10,
wherein one of the plural blocks of the baseband section is a demodulator,
wherein, said control circuit units set the demodulator operating states at the demodulation mode, and at the synchronous trapping mode, set input signal and clock of the demodulator are off state.

12. The receiver according to claim 11,
wherein one of the plural blocks of the baseband section is a synchronous tracking unit,
wherein at the demodulation mode, said control circuit units set the synchronous tracking unit operating states, and at the synchronous trapping mode, set input signal and clock of the synchronous tracking unit are off state.

13. A receiver that receives each of pulse signals spread by spread codes, comprising:
an RF front-end section which performs filtering and amplification on each received signal;
an AD converter section which analog-digital converts signals outputted from the RF front-end section;
a baseband section which inversely spreads the output of the AD converter section and performs signal detection and demodulation thereon;
a reception environment measuring section which measures reception environment constituted by components of the receiver using signals inputted to the baseband section;
a parameter setting section which sets parameters for the RF front-end, the AD converter section and the baseband section of the receiver;
a mode controller for controlling operation modes of the baseband section, the AD converter section, the reception environment measuring section, and the parameter setting section, and
a parameter register for storing the set parameters of the parameter setting section,
wherein the baseband section includes plural blocks and control circuit units provided in each of the respective blocks,
wherein, in the operation modes, there are a standby state mode, an initial setting mode, and a data reception mode,
wherein the mode controller set the receiver into the receiver standby state mode in usual,
wherein, when a signal is inputted from outside in the standby state, the mode controller set the receiver into the initial setting mode and reception environments are measured by the reception environment measuring section using signals inputted to the baseband section, and parameters for each section of the receiver are set on the basis of output signals of the reception environment measuring section, then, the mode controller set the receiver into the data reception mode for receiving said pulse signals,
wherein, when the data reception is completed, the receiver is set into the standby mode again, and
wherein operating/non-operating states of the respective blocks in the base section are respectively controlled by control circuit units provided in each of the respective blocks according to the operation modes.

14. The receiver according to claim 13,
wherein the AD converter section includes a plurality of AD converters,
wherein the input signals divided into plural form by the AD converter section are analog-digital converted by the plurality of AD converters, and
wherein a number of the AD converters used upon the receiving operation is set as one of said parameters by the parameter setting section prior to the start of the receiving operation.

15. The receiver according to claim 14,
wherein the baseband section includes plural matched filter units each of which respectively corresponds to each of plurality of AD converters, and an input signal adjustment unit,
wherein, based on the number of digital signals to be used from the plurality of AD converters, the input signal adjustment unit has a function to adjust the connection relation between input signals and output signals to the input signal adjustment unit.

16. The receiver according to claim 15,
wherein, at the initial setting mode, the parameter setting section performs the optimum setting of each parameter, and the used number of AD converters in the AD converter section is decided based on the measured reception environments, and unnecessary power supply for unused AD converters and unused matched filters are cut off.

17. A receiver that receives each of pulse signals spread by spread codes, comprising:

an RF front-end section which performs filtering and amplification on each received signal;

an AD converter section which analog-digital converts signals outputted from the RF front-end section;

a baseband section which inversely spreads the output of the AD converter section and performs signal detection and demodulation thereon;

a reception environment measuring section which measures reception environment constituted by components of the receiver using signals inputted in the baseband section;

a parameter setting section which sets parameters for the RF front-end, the AD converter section and the baseband section of the receiver;

a mode controller for controlling operation modes of the baseband section, the AD converter section, the reception environment measuring section, and the parameter setting section; and a parameter register for storing the set parameters of the parameter setting section, wherein the baseband section includes plural blocks and control circuit units provided in each of the respective blocks, wherein, in the operation modes, there are a standby state mode, a parameter setting during an initial setting mode, and a data reception mode for receiving transmitted data, wherein the mode controller set the receiver into the initial setting mode and reception environments are measured by the reception environment measuring section using signals inputted to the baseband section, and parameters for each section of the receiver are set on the basis of output signals of the reception environment measuring section, then the mode controller set the receiver into the standby state mode, wherein, when a signal is inputted from outside in the standby state, the mode controller set the receiver into the data reception mode, wherein, when the data reception is completed, the receiver is set into the standby mode again, and wherein operating/non-operating states of the respective blocks in the baseband section are respectively controlled by control circuit units provided in each of the respective blocks according to the operation modes.

18. The receiver according to claim 17, wherein the AD converter section comprises plural AD converters, wherein the baseband section includes plural matched filter units each of which respectively corresponds to each of plurality of AD converters, and an input signal adjustment unit, wherein, based on the number of digital signals to be used from the plurality of AD converters, the input signal adjustment unit has a function to adjust the connection relation between input signals and output signals to the input signal adjustment unit, wherein the input signals divided into plural form by the AD converter section are analog-digital converted by the plurality of AD converters, and wherein a number of the AD converters used upon the receiving operation is set as one of said parameters by the parameter setting section prior to the start of the receiving operation.

19. The receiver according to claim 18, wherein, at the initial setting mode, the parameter setting section performs the optimum setting of each parameter, and the used number of AD converters in the AD converter section is decided based on the measured reception environments, and unnecessary power supply for the AD converters and the matched filters are cut off, then the mode controller set the receiver into the standby state mode, wherein, when a signal is inputted from outside in the standby state, the mode controller set the receiver into the data reception mode, and wherein, when the data reception is completed, the receiver is set into the standby mode again.

20. The receiver according to claim 18, wherein the optimum parameters set at the initial setting mode is hold in the parameter register, then the receiver is set into the standby mode.

* * * * *